(12) United States Patent
Igata

(10) Patent No.: US 6,853,992 B2
(45) Date of Patent: Feb. 8, 2005

(54) STRUCTURED-DOCUMENT SEARCH APPARATUS AND METHOD, RECORDING MEDIUM STORING STRUCTURED-DOCUMENT SEARCHING PROGRAM, AND METHOD OF CREATING INDEXES FOR SEARCHING STRUCTURED DOCUMENTS

(75) Inventor: Nobuyuki Igata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 375 days.

(21) Appl. No.: 09/725,680

(22) Filed: Nov. 30, 2000

(65) Prior Publication Data

US 2001/0007987 A1 Jul. 12, 2001

(30) Foreign Application Priority Data

Dec. 14, 1999 (JP) .......................................... 11-353857

(51) Int. Cl.[7] .............................................. G06F 17/30
(52) U.S. Cl. ............................... 707/3; 707/6; 707/101; 707/203; 715/513
(58) Field of Search .................... 707/1–10, 100–104.1, 707/200–205; 345/853–854; 715/513–514

(56) References Cited

U.S. PATENT DOCUMENTS

| | | | |
|---|---|---|---|
| 5,706,496 A | | 1/1998 | Noguchi et al. |
| 5,727,195 A | | 3/1998 | Nakatsuyama |
| 5,870,739 A | * | 2/1999 | Davis et al. .................... 707/4 |
| 5,893,109 A | * | 4/1999 | DeRose et al. .......... 707/104.1 |
| 6,377,946 B1 | | 4/2002 | Okamoto et al. |
| 6,457,017 B2 | * | 9/2002 | Watkins et al. ......... 707/103 R |
| 6,510,425 B1 | | 1/2003 | Okamoto et al. |

FOREIGN PATENT DOCUMENTS

| | | |
|---|---|---|
| JP | 7-46908 | 3/1995 |
| JP | 07-056908 | 3/1995 |
| JP | 7-319918 | 12/1995 |
| JP | 8-249354 | 9/1996 |
| JP | 10-27183 | 1/1998 |
| JP | 10-027183 | 1/1998 |
| JP | 11-242676 | 9/1998 |
| JP | 11-15843 | 1/1999 |
| JP | 11-015843 | 1/1999 |
| JP | 11-053400 | 2/1999 |

* cited by examiner

Primary Examiner—Mohammad Ali
(74) Attorney, Agent, or Firm—Staas & Halsey LLP

(57) ABSTRACT

A query in which a sibling relationship among document parts, which are elements of a structured document, can be designated as a search condition is input, and a query tree which represents the query in a tree structure is created. A query converting unit refers to a hierarchical index in which a hierarchical relationship among document parts of each structured document to be searched is expressed in a tree structure, and converts the query tree to a Boolean expression. A text-index referring unit refers to a text index in which is registered information representing a relationship between each set including a character string in text data and a part-ID of a meta part and a document-ID of a document, thereby searching a document corresponding to the Boolean expression converted from the query tree.

19 Claims, 35 Drawing Sheets

FIG. 14

| CHARACTERISTIC ELEMENT | PART IDENTIFIERS | | LIST OF DOCUMENT IDENTIFIERS |
|---|---|---|---|
| ? ? | 0 | → | 1:-1,2-1 |
| ? ? | 1 | → | 1:-1 |
| ? ? | 2 | → | 1:-1 |
| ? ? | 3 | → | 1:-1,2:-1 |
| ? ? | 4 | → | 2:-1 |
| ? ? | 5 | → | 2:-1 |
| ˆ文 | 2 | → | 1:4 |
| ˆ文 | 4 | → | 2:0 |
| ˆ検 | 3 | → | 1:7,2:7 |
| ˆ構 | 1 | → | 1:0 |
| ˆ構 | 5 | → | 2:3 |
| 文書 | 2 | → | 1:5 |
| 文書 | 4 | → | 2:1 |
| 検索 | 3 | → | 1:8,2:8 |
| 構造 | 1 | → | 1:1 |
| 構造 | 5 | → | 2:4 |
| 造化 | 1 | → | 1:2 |
| 造化 | 5 | → | 2:5 |
| 書$ | 2 | → | 1:6 |
| 書$ | 4 | → | 2:2 |
| 索$ | 3 | → | 1:9,2:-9 |
| 化$ | 1 | → | 1:3 |
| 化$ | 5 | → | 1:6 |

SEARCH KEY (51), LIST OF DOCUMENT IDENTIFIERS (52)

BOOLEAN LOGIC TREE

BOOLEAN LOGIC TREE

FIG. 21A
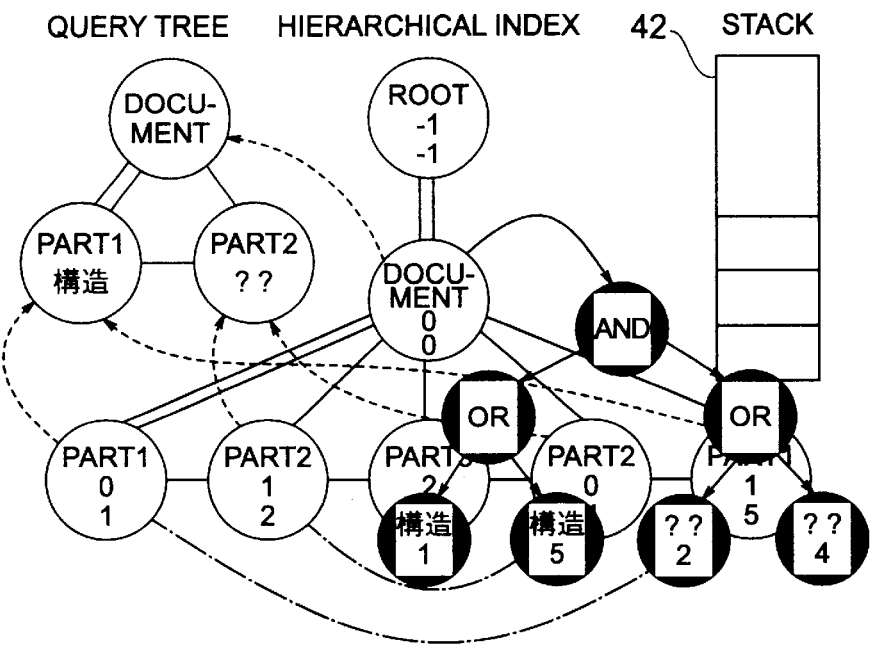
FIG. 21B
FIG. 21C

BOOLEAN LOGIC TREE

BOOLEAN LOGIC TREE

BOOLEAN LOGIC TREE

STRUCTURED-DOCUMENT SEARCH APPARATUS AND METHOD, RECORDING MEDIUM STORING STRUCTURED-DOCUMENT SEARCHING PROGRAM, AND METHOD OF CREATING INDEXES FOR SEARCHING STRUCTURED DOCUMENTS

CROSS REFERENCE TO RELATED APPLICATIONS

The contents of Japanese Patent Application No. 353857/1999, filed Dec. 14, 1999 in Japan, is incorporated herein by reference.

BACKGROUND OF THE INVENTION

1. Field of the Invention

The present invention relates to an apparatus for searching a document structure and document contents at high speed from a large number of structured documents, such as SGML documents, registered in a data base. More particularly, the present invention relates to a structured-document search apparatus which has means to convert a query of structure and contents to a Boolean expression which has been used in a conventional full-text search engine, to thereby enable utilization of the high-speed search performance of the full-text search engine.

2. Description of the Related Art

As a result of recent popularization of word processors and development of OCRs (Optical Character Readers), a huge volume of electronic documents have been created and accumulated. As the amount of accumulated documents becomes increasingly huge, demand for searching a necessary document at high speed becomes stronger and stronger.

In order to satisfy such demand, there have been developed a full-text search engine as described in, for example, Japanese Patent Application Laid-Open No. 10-27183 (Data Registration Method and Apparatus) and Japanese Patent Application Laid-Open No. 8-249354 (Word Index, Word-index Creation Apparatus, and Document Search Apparatus). Such a full-text search engine is designed to search the entirety of each document, and has indexes for referring at high speed to documents which include a designated search key. Each of the full-text search engines described in these publications eliminates the necessity of adding to each document keywords for searching and does not cause oversight during searching. However, since the entirety of each document is searched in a uniform or fixed manner, a search request with designation of a document structure cannot be processed.

Meanwhile, with explosive popularization of the Internet, there have been created a large volume of documents each having a structure (hereinafter referred to as "structured documents"), such as HTML (Hypertext Markup Language) documents and XML (Extensible Markup Language) documents. Further, in enterprises, SGML (Standard Generalized Markup Language) documents have been created and accumulated for the document management and re-use of documents. In relation to search of such structured documents, there has been increasing demand for a technique which does not only search the entirety of each structured document uniformly but also enables a user to designate search conditions for each part of each document. In order to satisfy such demand, there have been developed various techniques; e.g., techniques disclosed in Japanese Patent Application Laid-Open No. 11-15843 (SGML Document Search Apparatus and SGML Document Search Method), Japanese Patent Application Laid-Open No. 11-53400 (Structured-Document Search apparatus and Machine-Readable Recording Medium Storing Program), and Japanese Patent Application Laid-Open No. 11-242676 (Structured-Document Registration Method, Search method, and Transportable Medium used Therefor).

Japanese Patent Application Laid-Open No. 11-15843 discloses a technique such that structured documents are registered into a relational data base; and a user is allowed to input a search request by use of SQL, which is a conventional query language for data base query. When such a technique is used, a schema must be defined in advance, and document parts which do not conform to the schema cannot be registered. Further, when a large volume of documents is registered in the data base, the search speed decreases. Therefore, in order to search the contents of documents at high speed, a full-text search engine must be provided separately from the data base.

Japanese Patent Application Laid-Open No. 11-53400 discloses a technique such that a certain region of each document is divided into a plurality of zones; and searching is performed by use of a Boolean expression on the basis of combination of a zone and a keyword. Although this technique can search at high speed the contents of text data included in a certain document part, it does not allow a user to include in search conditions a hierarchical relationship between document parts.

Japanese Patent Application Laid-Open No. 11-242676 discloses a technique which utilizes a structure index obtained through superposition of document parts of the document registered in a data base and a character index in relation to contents of each document. Although this technique requires an index for holding the structures of documents in addition to an index of an ordinary full-text search engine, it can perform searching at high speed under search conditions which include a hierarchical relationship between document parts.

Japanese Patent Application Laid-Open No. 7-56908 (Document Processing Apparatus) and Japanese Patent Application Laid-Open No. 7-319918 (Apparatus for Designating Object to be Subjected to Document Searching) disclose techniques for searching structured documents. Although these publications disclose a method for searching a single structured document, the publications do not disclose a technique adapted to search a specific document from a large volume of structured documents.

The above-described Japanese Patent Application Laid-Open No. 11-242676 discloses a method for searching at high speed under search conditions which include the hierarchical relationship of document parts. However, a hierarchical relationship which can be included in search conditions is limited to a parent-child relationship and a child-grandchild relationship, and the patent publication does not disclose a method which enables a user to include a sibling relationship in search conditions.

A problem which would arise when a sibling relationship between document parts cannot be included in search conditions will be described below.

---

<Employee>
    <Section> SYSTEM DEVELOPMENT DEPT. </Section>
    <Name> YAMADA TARO </Name>
</Employee>
<Employee>

```
    <Section> GENERAL AFFAIRS DEPT. </Section>
    <Name> SUZUKI HANAKO </Name>
  </Employee>
```

When searching conditions "SUZUKI HANAKO in SYSTEM DEVELOPMENT DEPT." are set for searching of such structured documents, the searching conditions are described more specifically such that in a certain document part of <Employee> element, the text data of <Section> element represent "SYSTEM DEVELOPMENT DEPT." and the text data of <Name> element represent "SUZUKI HANAKO". In this case, if a sibling relationship between the document parts cannot be included in the search conditions, a user has no choice but to set the search conditions such that the text data of <Section> element represent "SYSTEM DEVELOPMENT DEPT." and the text data of <Name> element represent "SUZUKI HANAKO". Therefore, there is a possibility that a search result different from a desired one is obtained.

The above-described Japanese Patent Application Laid-Open No. 11-242676 further discloses a technique for creating a structure index obtained through superposition of structures of structured documents which are to be subjected to searching. In the technique, when the structures of structured documents are superposed, two nodes are regarded to correspond to each other, if the respective upper nodes of the two nodes correspond to each other, the two nodes are of the same element name, and the two nodes are the same in terms of order of appearance in a row of sibling nodes as determined from the head of the row of the sibling nodes with respect to the forward direction. Therefore, the following Document 1 and Document 2 are treated as having completely the same structure and text data.

```
· Document 1
    <Document>
              <Part1> STRUCTURING </Part1>
              <Part2> DOCUMENT </Part2>
              <Part3> RETRIEVAL </Part3>
    </Document>
· Document 2
    <Document>
              <Part2> DOCUMENT </Part2>
              <Part1> STRUCTURING </Part1>
              <Part3> RETRIEVAL </Part3>
    </Document>
```

In other words, although the row of sibling nodes of the same element name is reserved, the order of sibling nodes of different element name is ignored.

Further, in the technique described in Japanese Patent Application Laid-Open No. 11-242676, search conditions are always set to include search keys and structure designation in combination; and this patent publication does not disclose a method in which only structure designation is used as a search condition.

Moreover, in general, when a hierarchical relationship between document parts is retrieved from structured documents accumulated in a large volume, the time required for such retrieval increases with the degree of complexity of the structures of registered documents.

SUMMARY OF THE INVENTION

An object of the present invention is to provide means to enable a sibling relationship between document parts to be included in search conditions, in a system which retrieves a necessary document at high speed from structured documents accumulated in a large volume.

Another object of the present invention is to provide means which solves the above-described problems through use of a hierarchical index which reserves an order of sibling nodes of different element name.

Still another object of the present invention is to provide means which enables a user, at the time of searching, to select whether the order of sibling nodes is to be included in search conditions.

Still another object of the present invention is to provide means which enables designation of only a structure as a search condition.

Still another object of the present invention is to provide means to increase the speed of matching of a hierarchical relationship between document parts to thereby increase the search speed of a search system.

Still another object of the present invention is to provide means to easily effect complete-match search and partial-match search in matching of text data.

The present invention solves the above-described problems involved in the conventional methods through provision of a hierarchical index which expresses the structure of each structured document such that the hierarchical relationship among document parts is expressed in a tree structure in which a "meta part" is treated as a single node; a text index in which a character string contained in text data of each "document part" is registered; and search means which receives a user's query in a tree structure and converts it to a Boolean expression. The term "document part" refers to each element part of each structured document, and the term "meta part" refers to each element part which is common among several structured documents.

Specifically, the present invention provides a structured-document search apparatus comprising: a hierarchical index which expresses the structure of each structured document such that the hierarchical relationship among document parts is expressed in a tree structure in which a meta part is treated as a single node; a text index in which is registered correspondence between each search key and a document identifier (document-ID) of a document which includes the search key, the search key including a character string in text data and a part identifier (part-ID) of a meta part; and search means which receives or inputs a user's query in a tree structure (hereinafter referred to as an "query tree") and refers to the hierarchical index and the text index in order to obtain a document corresponding to the query tree.

The structured-document search apparatus of the present invention enables a user to express in a tree structure a relationship among document parts which serves as a search condition in a certain query, and further enables the user to designate in the tree structure a sibling relationship among document parts. Moreover, when such a sibling relationship is incorporated into the search conditions, the user can designates a sibling relationship with order or a sibling relationship without order. This enables the search means to compare the query tree and the hierarchical index on the basis of a designated one between the sibling relationship with order and the sibling relationship without order.

The search means has processing means to perform processing in the following two steps:

(1) referring to the hierarchical index and converting the query tree to a Boolean expression in which a set having a character string and a part-ID is used as a single search key; and (2) referring to the text index and obtaining a document-ID of a document corresponding to the query tree, by use of the Boolean expression.

Further, nodes representing meta parts are characterized in that the nodes satisfy requirements in relation to meta parts such that the nodes share a common upper node meta part, the nodes have the same element name and the same occurrence position (we call it "offset") in a row of sibling parts in the document, and each node has an offset in a row of sibling parts in the document, a link extending from a child node to a parent node, and a link extending to another node having the same element name. This feature enables high-speed searching even when documents have a complicated structure.

Moreover, the structured-document search apparatus of the present invention includes means which is used for creation of the text index and which operates, when a set having a character string in text data and a part-ID is created, in order to create, for each document part, a special search key composed of a special character string and a part-ID and to register the special search key in the text index. This enables easy search of a structure only (search performed under a single search condition of a certain document part being contained).

Furthermore, the structured-document search apparatus of the present invention includes means which is used for creation of the text index and which operates, when a set of a character string in text data and a part-ID is created, in order to create, for each text data set, pseudo text data which are obtained through addition of special character strings at the start and end position of the text data, and to create a search key from the pseudo text data to register the search key in the text index. This enables both of complete-match search and partial-match search.

The present invention greatly differs from conventional structured-document search apparatus in that provision of the search means—which receives a user's query in a tree structure and searches a document with reference to the hierarchical index and the text index—enables a user to include a sibling relationship among document parts into search conditions. Further, use of a hierarchical index which stores an order of sibling nodes of different element name enables a user to include a sibling order relationship in search conditions.

These, together with other objects and advantages which will be subsequently apparent, reside in the details of construction and operation as more fully described and claimed hereinafter, with reference to the accompanying drawings, wherein like numerals refer to like parts throughout.

BRIEF DESCRIPTION OF THE DRAWINGS

FIG. 14 is a diagram showing example registration of documents having simple structures in the text index;

FIGS. 18A to 21C are diagrams showing an internal operation for converting Search Request 4 to a Boolean expression;

DESCRIPTION OF THE PREFERRED EMBODIMENT

Figure 1:
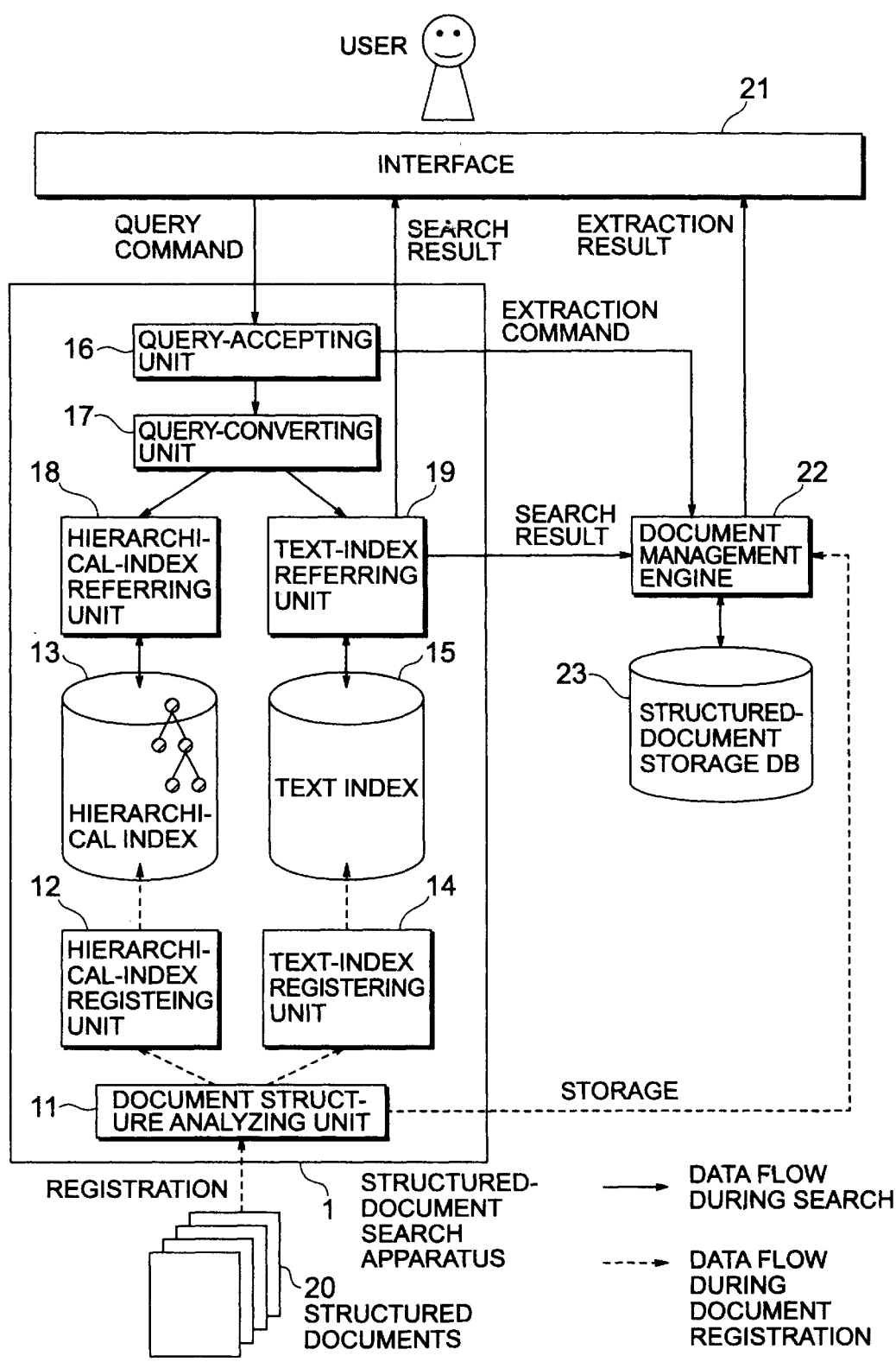
FIG. 1 is a diagram showing an example configuration of a system according to an embodiment of the present invention.

An embodiment of the present invention will now be described. FIG. 1 shows an example system configuration of a structured-document search apparatus according to the embodiment of the present invention. In FIG. 1, broken lines with arrows show flow of data at the time of registering documents, and solid lines with arrows show flow of data at the time of searching a document.

At the time of document registration, a document-structure analyzing unit 11 analyzes the structures of structured documents 20; and a hierarchical-index registering unit 12 creates a hierarchical index 13. At the same time, a text-index registering unit 14 creates a text index 15.

At the time of document search, the following processing is performed. That is, a query-accepting unit 16 accepts a query from a user via an interface 21 and creates a query tree on the basis of the accepted query. Further, while referring to the hierarchical index 13 via a hierarchical-index referring unit 18, a query-converting unit 17 collates the structure of the query tree with those registered in the hierarchical index 13, and adds temporary nodes to matched portions. By use of the temporary nodes, the query-converting unit 17 creates a Boolean logic tree, and then creates a Boolean expression (character string) from the logic tree. On the basis of the created Boolean expression, a text-index referring unit 19 obtains the document-ID of a document corresponding to the query and returns a search result to the user.

If necessary, a document management engine 22 may be disposed near the structured-document search apparatus 1. At the time of document registration, the structured documents 20 themselves are stored in a structured-document storage data base (DB) 23, and at the time of document search, a necessary portion of a searched document is extracted and returned to the user. At this time, the document management engine 22 receives a query of the user from the query-accepting unit 16, receives a search result from the text-index referring unit 19, and extracts the necessary portion of the searched document and returns it to the user. Hereinbelow, the respective means will be described in more detail.

Hierarchical Index

In the present invention, in order to increase the speed of matching of hierarchical relationships of document parts, in addition to an index which has been used in conventional full-text search engines, the hierarchical index 13 is provided. In the hierarchical index 13, the structures of the structured documents 20 subjected to searching are expressed in a tree structure.

Figure 2A:
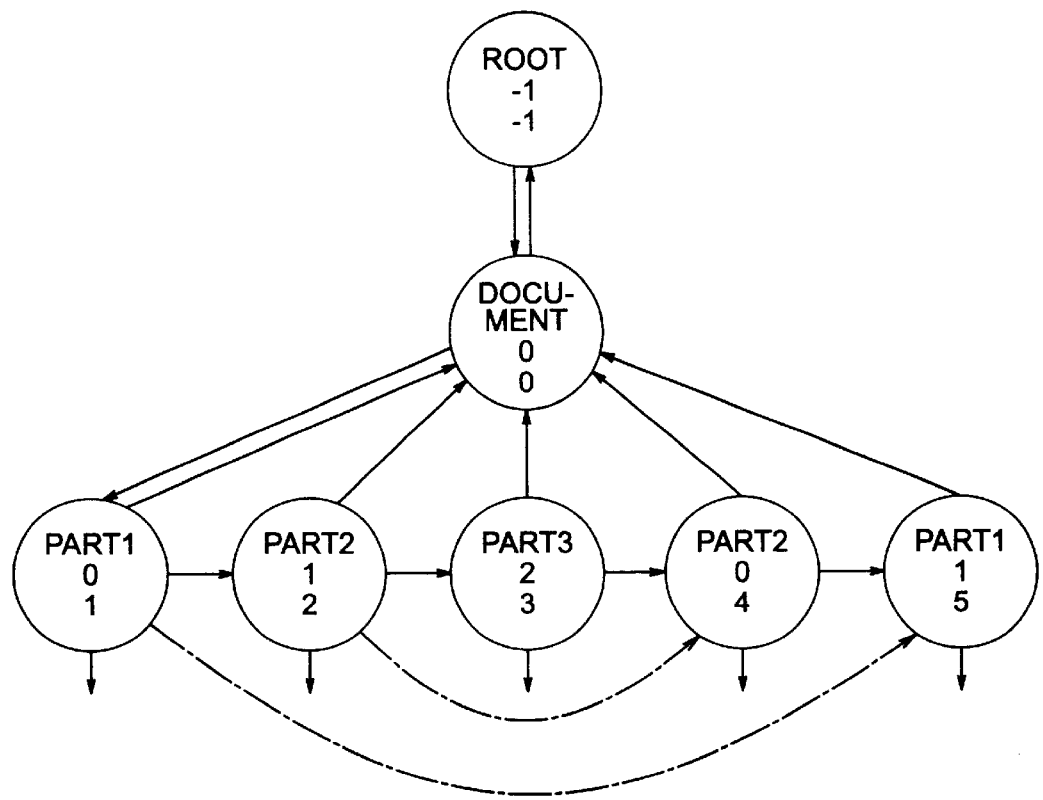
FIGS. 2A and 2B are diagram showing an example of an index.
Figure 2B:
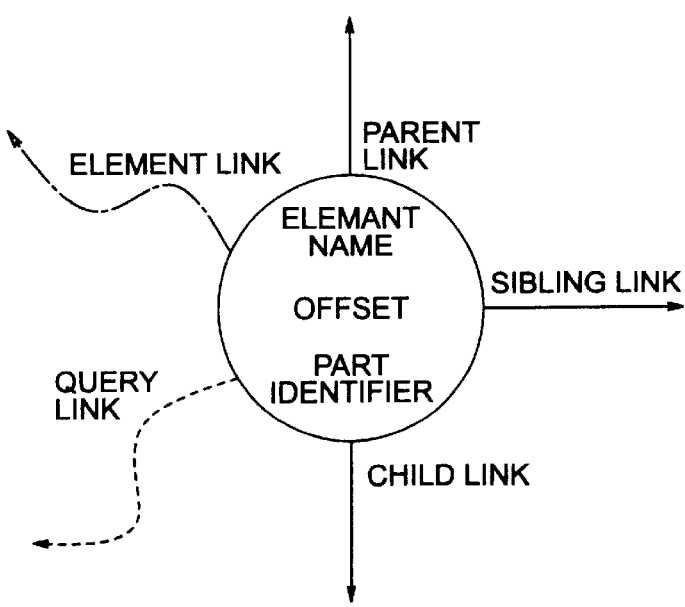

FIGS. 2A and 2B show an example structure of the hierarchical index 13. Specifically, FIG. 2A shows the overall structure of a hierarchical index created upon registration of Documents 1 and 2, which were used in the "Description of the Related Art" section.

---

· Document 1
    <Document>
        <Part1> STRUCTURING </Part1>
        <Part2> DOCUMENT </Part2>
        <Part3> RETRIEVAL </Part3>
    </Document>
· Document 2
    <Document>
        <Part2> DOCUMENT </Part2>
        <Part1> STRUCTURING </Part1>
        <Part3> RETRIEVAL </Part3>
    </Document>

---

In the hierarchical index 13, documents parts of each structured document 20 having a common structure are expressed in the form of a single node as a meta part, and a hierarchical relationship between meta parts is represented in the form of a tree structure.

As shown in FIG. 2B, each node has an element name, an offset in a row of sibling parts in the document, a part-ID for identifying a meta part, a link to a parent node (a parent link), a link to a sibling node (a sibling link), and a link to a child node (a child link). Each node further has a link to another node having the same element name (an element link) and a link to a node of a query tree (a query link). The parent link, the child link, and the sibling link form a tree structure. The element link is used at the time of document structure matching, and the query link is used at the time of conversion to a Boolean expression. Document parts are considered to be the same meta part when they share a common upper meta part, they have the same element name, and they have the same offset in the row of sibling parts in the document.

Figure 3:
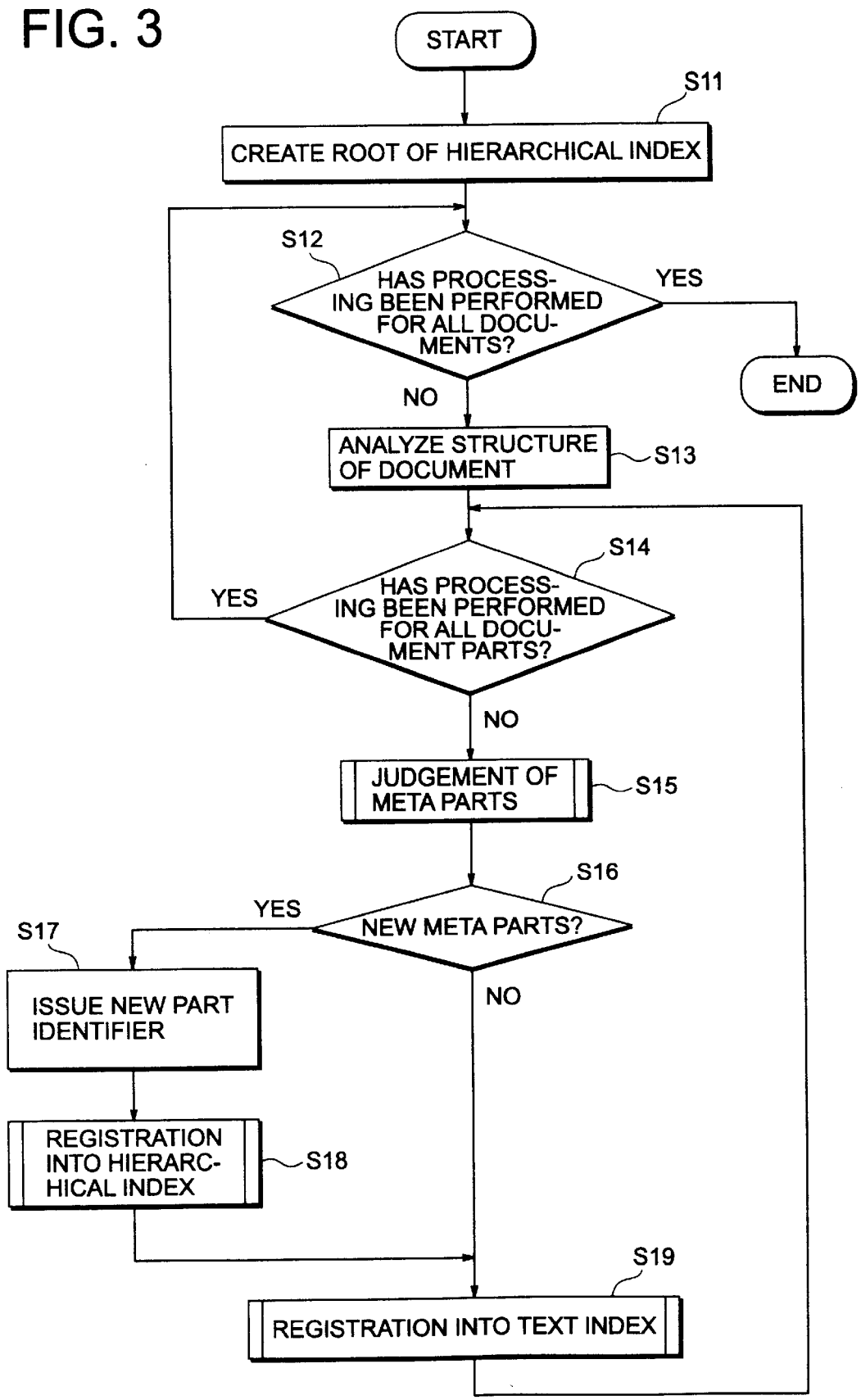
FIG. 3 is a flowchart showing the steps of processing for registering structured documents.

FIG. 3 is a flowchart showing the steps of processing for registering structured documents. The processing includes four major stages, as follows.

1) Analyzing the structure of a document (step S13);
2) Judging whether each document part is a meta part (step S15);
3) When the document part is a meta part, registering the node in the hierarchical index 13 as the meta part (step S18); and
4) Registering in the text index 15 the identifier of the meta part and text data contained therein (step S19).

At the time of registration of structured documents, a root node of the hierarchical index 13 is first created (step S11), and the steps described below are repeated until the processing has been performed for all the documents (step S12).

First, the structure of a presently-selected (i.e., presently-considered) document to be registered is analyzed (step S13), and when the processing in step S15 to S19 has been performed for all the document parts of the selected document, the processing returns to step 12, and the same processing is repeated for a document to be registered next (step S14).

In step S15, processing for judging whether a presently-selected document part of the selected document is a meta part is performed. When the selected document part is identified as a new meta part (step S16), a new part-ID is issued (step S17) and is registered in the hierarchical index 13 (step S18). Subsequently, registration into the text index 15 is performed (step S19). When the selected document part is identified as not being a new meta part, without registration in the hierarchical index 13, registration into the text index 15 is performed (step S19).

The order in which the documents parts undergo the processing in step S14 corresponds to the order in which corresponding start tags appear in the selected document. This means that when the structure of a structured document is expressed in the form of a tree structure, respective document parts are processed while the priority is given their depth.

Figure 4:
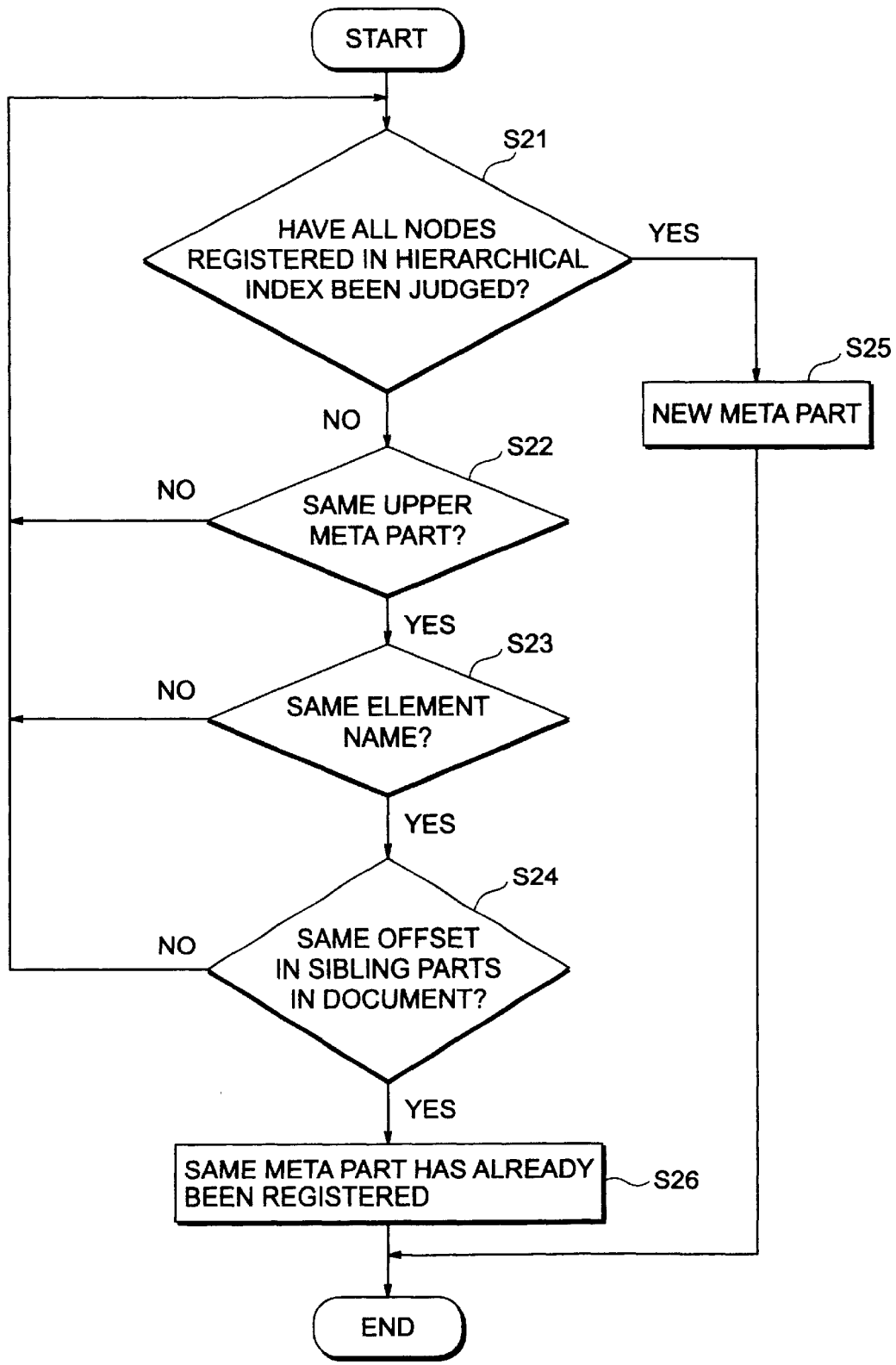
FIG. 4 is a flowchart showing the steps of processing for meta part judgement.

FIG. 4 is a flowchart showing the steps of processing for meta part judgment (details of the processing in step S15 of FIG. 3). The judgment as to whether a selected document part is a meta part is performed on the basis of whether a meta part which satisfies the following three conditions has already been registered in the hierarchical index 13:

1) Sharing a common upper meta part (step S22);
2) Having the same element name (step S23); and
3) Having the same offset in the row of sibling parts in a corresponding document (step S24).

When the selected document part has not yet been registered in the hierarchical index 13 (step S21), the selected document part is regarded to be a new meta part (step S25) and is registered in the hierarchical index 13 (steps S17 and S18 of FIG. 3). When the selected document part has already been registered in the hierarchical index 13, it is judged that the same meta part has already been registered (step S26), and, without registration in the hierarchical index 13, the registration of text data in the text index 15 is performed (step S19 of FIG. 3).

Figure 5:
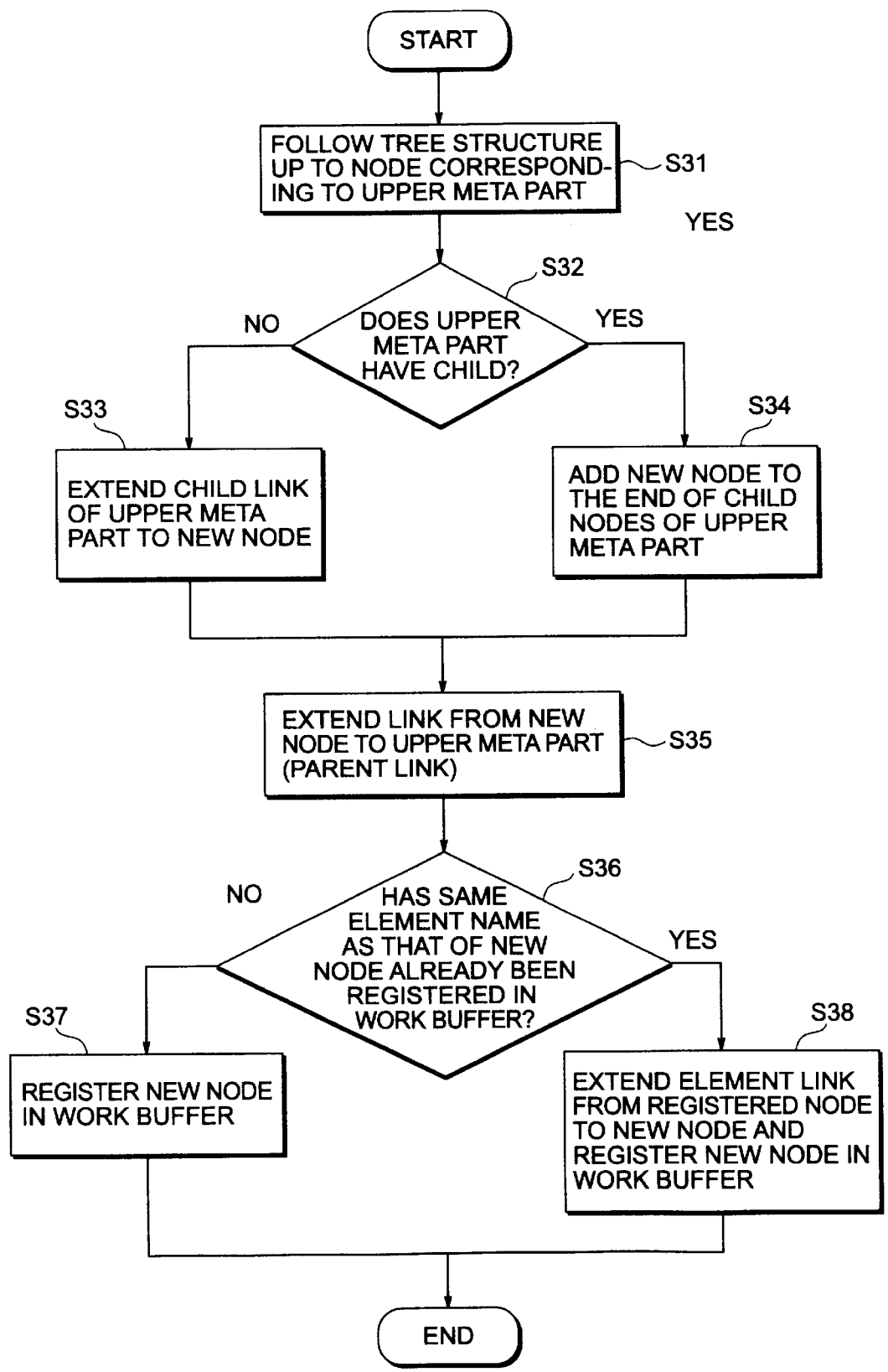
FIG. 5 is a flowchart showing the steps of processing for registration in a hierarchical index.

FIG. 5 is a flowchart showing the steps of processing for registration in the hierarchical index 13 (details of the processing in step S18 of FIG. 3). This processing includes the following four stages.

1) Following the tree structure up to a node corresponding to the upper meta part (step S31);
2) When the upper meta part has no child (step S32), extending a child link of the upper meta part to the new node (step S33), and when the upper meta part has a child, adding the new node (sibling link) to the end of the child node of the upper meta part (step S34);
3) Extending a link (parent link) from the new node to the upper meta part (step S35); and 4) Extending an element link to a node having the same element name.

The processing of extending an element link described in the above stage 4) is performed by means of the following steps.

(a) Preparing a work buffer in which element names are registered and from which links are extended to corresponding nodes;

(b) When the work buffer is empty (no element name is registered) (step S36), registering a new node in the work buffer (step S37); and (c) When a node has been registered in the work buffer (step S36), extending an element link from the registered node to the new node, and registering the new node in the work buffer (step S38).

Text Index

The text index 15 is used to obtain a document-ID of a document including a search key, on the basis of the search key which includes a character string to be searched (hereinafter referred to as a "search character string") and a part-ID in combination. The text index 15 assumes the same form as that of indices which are used in conventional full-text search engines, except that a search character string and a part-ID form a single search key set. That is, any of index forms, such as an inverted file, a signature file, and a bit-map file, which are used in conventional full-text search engines, may be used as a form of the index for obtaining a document-ID from a search key.

In the present embodiment, a set (special search key) which includes a special character string and a part-ID is registered for each document part, which enables searching of a structure only (search which is performed under a single search condition that a certain document part is present).

Further, pseudo text data are prepared from text data through addition of a special character string at the start and end positions of the text data; and characteristic elements serving as minimal units for searching are extracted from the pseudo text data. At the time of search, a set of "(special character string at the start position)+(search character string)+(special character string at the end position)" and a part-ID is used as a search key. Thus, a complete-match search of text data is realized. The term "characteristic element" refers to the smallest piece of information that can be searched for. Morphological analysis, N-gram division, or any other suitable method may be used to divide text data into characteristic elements.

Figure 6:
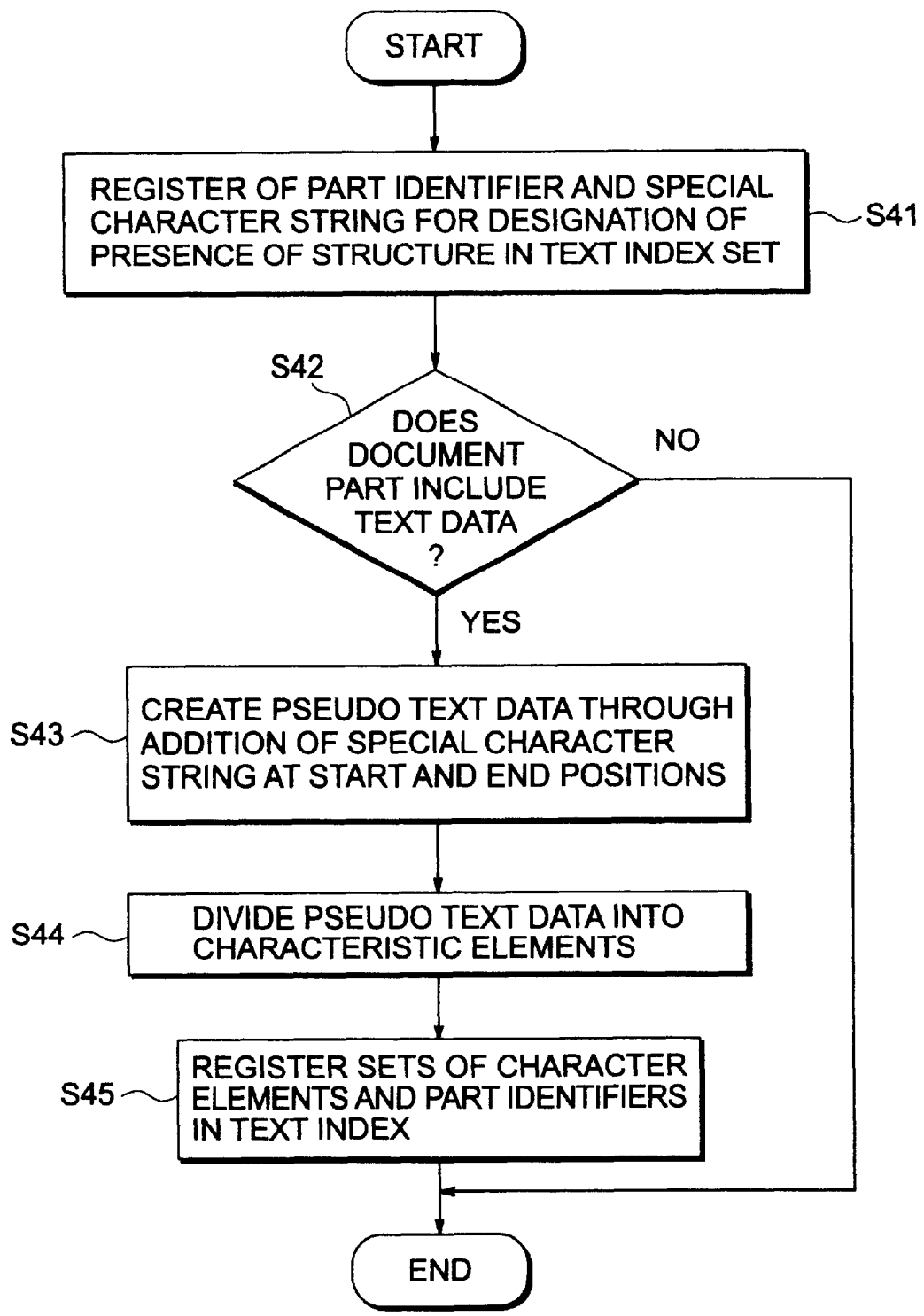
FIG. 6 is a flowchart showing the steps of processing for registration in a text index.

FIG. 6 is a flowchart showing the steps of processing for registration in the text index (details of the processing in step S19 of FIG. 3). As shown in the processing steps of FIG. 3, registration in the text index 15 is performed for each document part.

This registration processing includes the following four stages.

1) Registering into the text index 15 a special search key; i.e., a set including a part-ID and a special character string representing the presence of a structure (step S41);

2) When a presently-selected document part contains text data (step S42), creating pseudo text data from the text data through addition of special character strings at the start and end positions of the text data (step S43);

3) Dividing the pseudo text data into characteristic elements (step S44); and

4) Registering in the text index 15 search keys; i.e., sets each including the characteristic element and the part-ID (step S45).

Each of the special character string for representing the presence of a structure and the special character strings which are inserted at the start and end positions of text data may be a character string (a row of codes other than character codes) which does not appear in text data.

Figure 7:
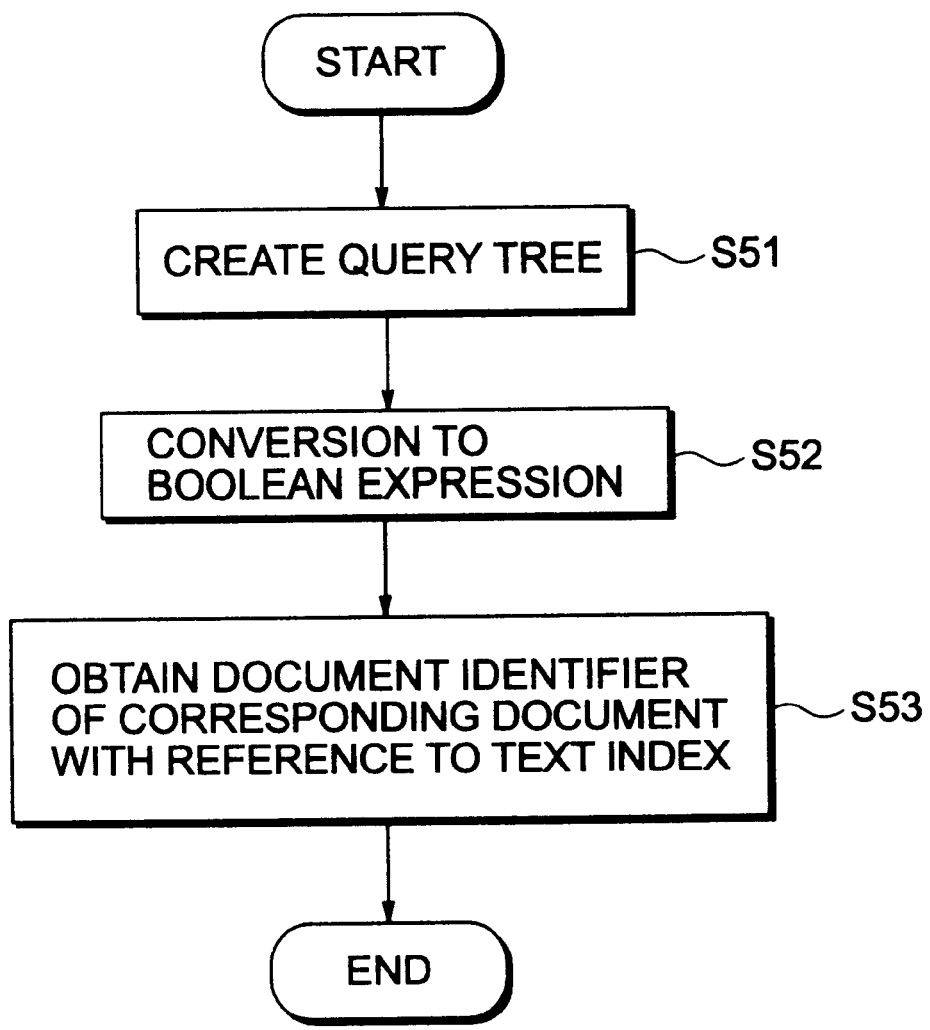
FIG. 7 is a flowchart showing the steps of processing for searching structured documents.

Processing for Conversion of a Query Tree to Boolean Expression at the Time of Search FIG. 7 is a flowchart showing the steps of processing for searching structured documents. This processing includes the following three stages, thereby a document-ID, which corresponds to the query from the user, is obtained.

1) Creating a query tree from a user's query (step S51);

2) Converting the query tree to a Boolean expression with reference to the hierarchical index 13 (step S52); and 3) Referring to the text index 15 by use of the Boolean expression (step S53).

The user's query may be created by use of an object-oriented query language, a query language for XML documents, which is currently standardized by W3C (World Wide Web Consortium), or any other suitable language.

Figure 8A:
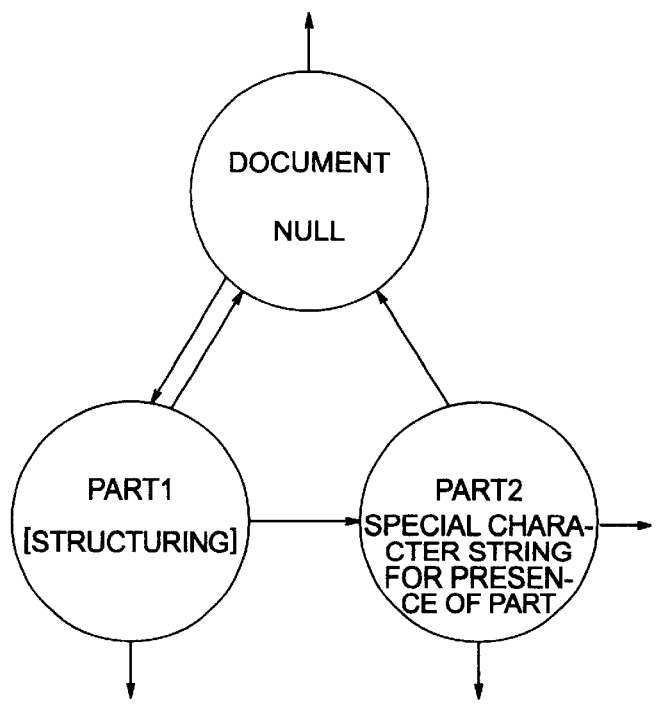
FIG. 8 is a diagram showing an example structure of a query tree.

Since the steps of creating a query tree vary depending on a query language to be used, here, only an example structure of a query tree is shown in FIGS. 8A. and 8B. FIG. 8A shows an example query tree which represents search conditions which are set for the hierarchical index shown in FIG. 2A such that a document part having an element name "Document" has a child "Part1," a "Part2" follows the "Part1," and the text data of the "Part1" contain a character string representing "STRUCTURING."

When the order of parts serving as children is not considered, the conditions that a "Part1" is present and that a "Part2" follows the "Part1" is replaced with the condition that the "Part1" and "Part2" are present.

Figure 8B:
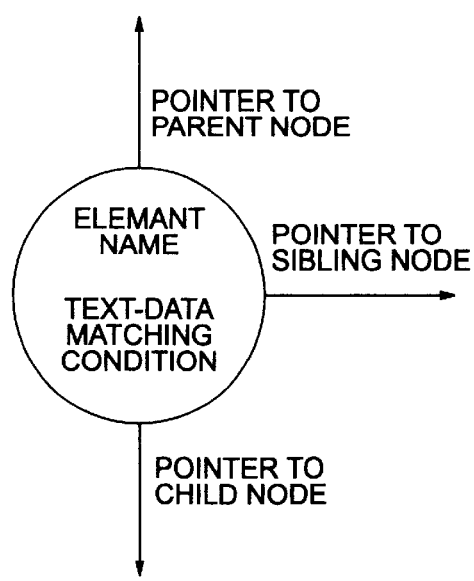

Such a query tree is used for matching of a document in which nodes representing document parts form a tree structure, and which has, as a partial tree, a tree structure similar to the query tree. As shown in FIG. 8B, each node of the query tree has an element name, a text-data matching condition, a pointer to a parent node, a pointer to a sibling node, and a pointer to a child node. When only the presence of a document part or parts is queried, the special character string which has been registered through processing in step S41 of FIG. 6 is used as the text-data matching condition. When perfect-match search is performed, the condition "(special character string at the start position)+(search character string)+(special character string at the end position)" is used as the text-data matching condition.

Figure 9:
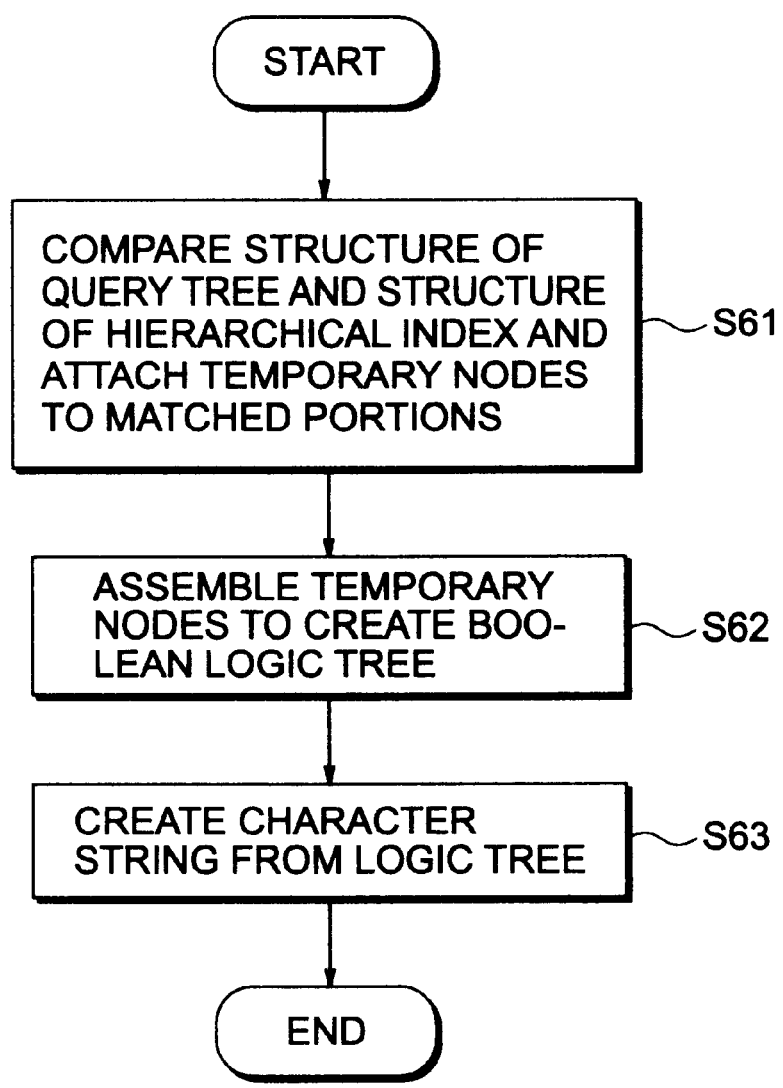
FIG. 9 is a flowchart showing the steps of processing for converting a query tree to a Boolean expression.

FIG. 9 show the steps of processing for converting a query tree to a Boolean expression (details of the processing in step S52 of FIG. 7). This processing includes the following three stages.

1) Searching from the hierarchical index 13 portions that match the structure of the query tree, and attaching temporary nodes to the matched portions (step S61).

2) Assembling the temporary nodes to create a Boolean logic tree (step S62); and 3) Creating a Boolean expression (character string) from the Boolean logic tree (step S63).

Within the full-text search engine, a Boolean expression, which is a character string, is analyzed in order to create a Boolean logic tree. Therefore, when the form of the Boolean logic tree created in step S62 shown in FIG. 9 is rendered the same as that used in the full-text search engine, the processing in step S63 may be omitted.

Figure 10:
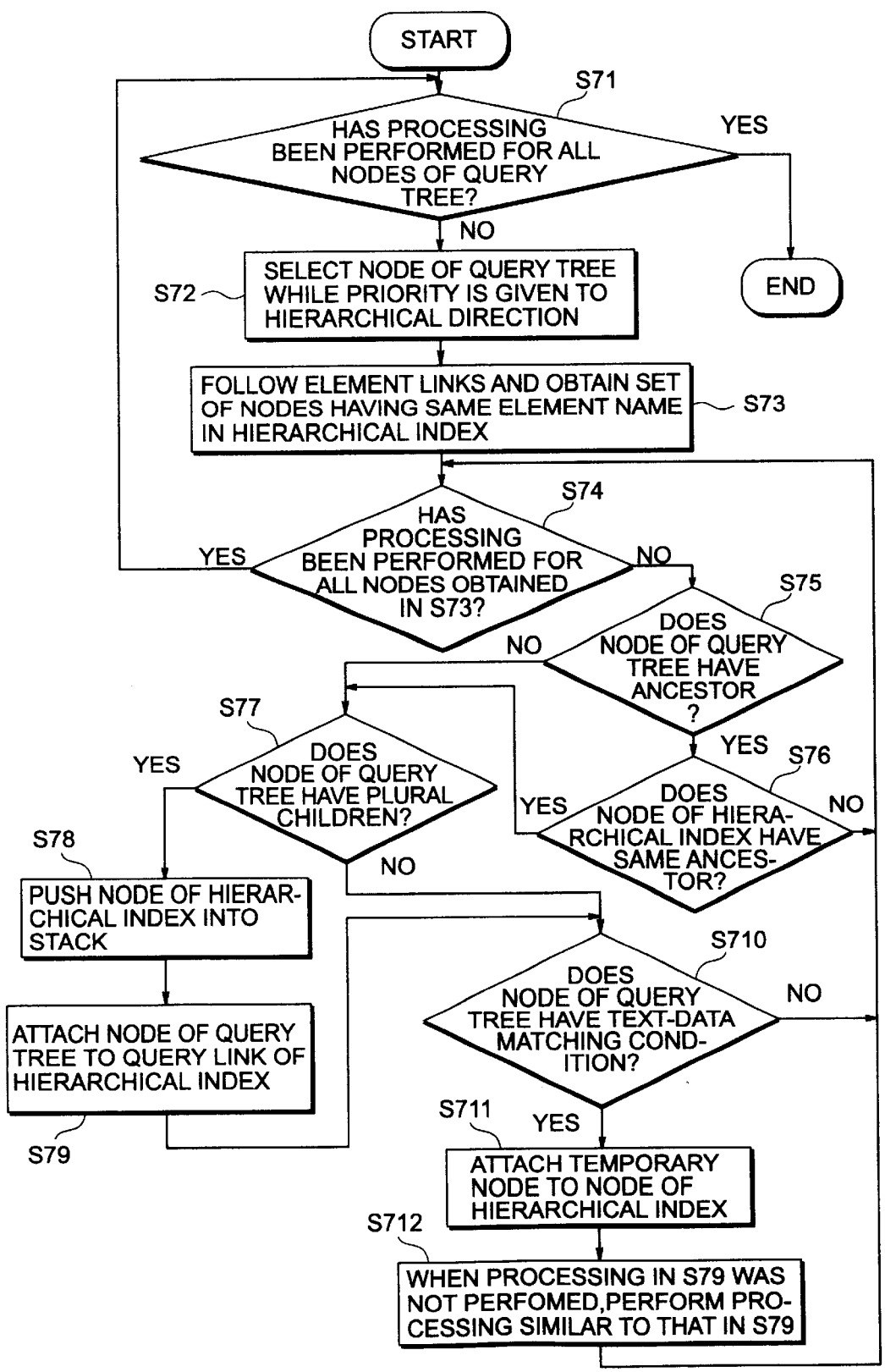
FIG. 10 is a flowchart showing the steps of processing for matching of a query tree structure and for addition of temporary nodes.

FIG. 10 shows the steps of processing for matching of query tree structures and for addition of temporary nodes (details of the processing in step S61 of FIG. 9). This processing includes the following six stages.

1) Going around the nodes of the query tree while giving priority in the hierarchical depth (steps S71 and S72);
2) Obtaining from the hierarchical index 13 a set of nodes corresponding to each node (step S73);
3) For the set obtained in 2) above, judging whether a parent-child relationship (including ancestors) which is the same as that of the nodes of the query tree is present (steps S75 and S76);
4) When a presently-selected node of the query tree has a plurality of child nodes, pushing the node of the hierarchical index 13 into a stack (steps S77 and S78);
5) When the presently-selected node of the query tree has a text-data matching condition (including a query which inquires only the presence of a document part), adding a temporary node to a node of the hierarchical index 13 (step S711); and
6) Extending a query link of the node of the hierarchical index 13 to the corresponding node of the query tree (steps S79 and S712).

Each temporary node serves as a node of a Boolean logic tree. Such a temporary node is created to have a node type (AND, OR, the type of a search key), a text-data matching condition, and a part-ID. A node whose type is AND or OR is used as an intermediate node, and ultimately, a single logic tree is assembled in step S62 of FIG. 9.

Figure 11:
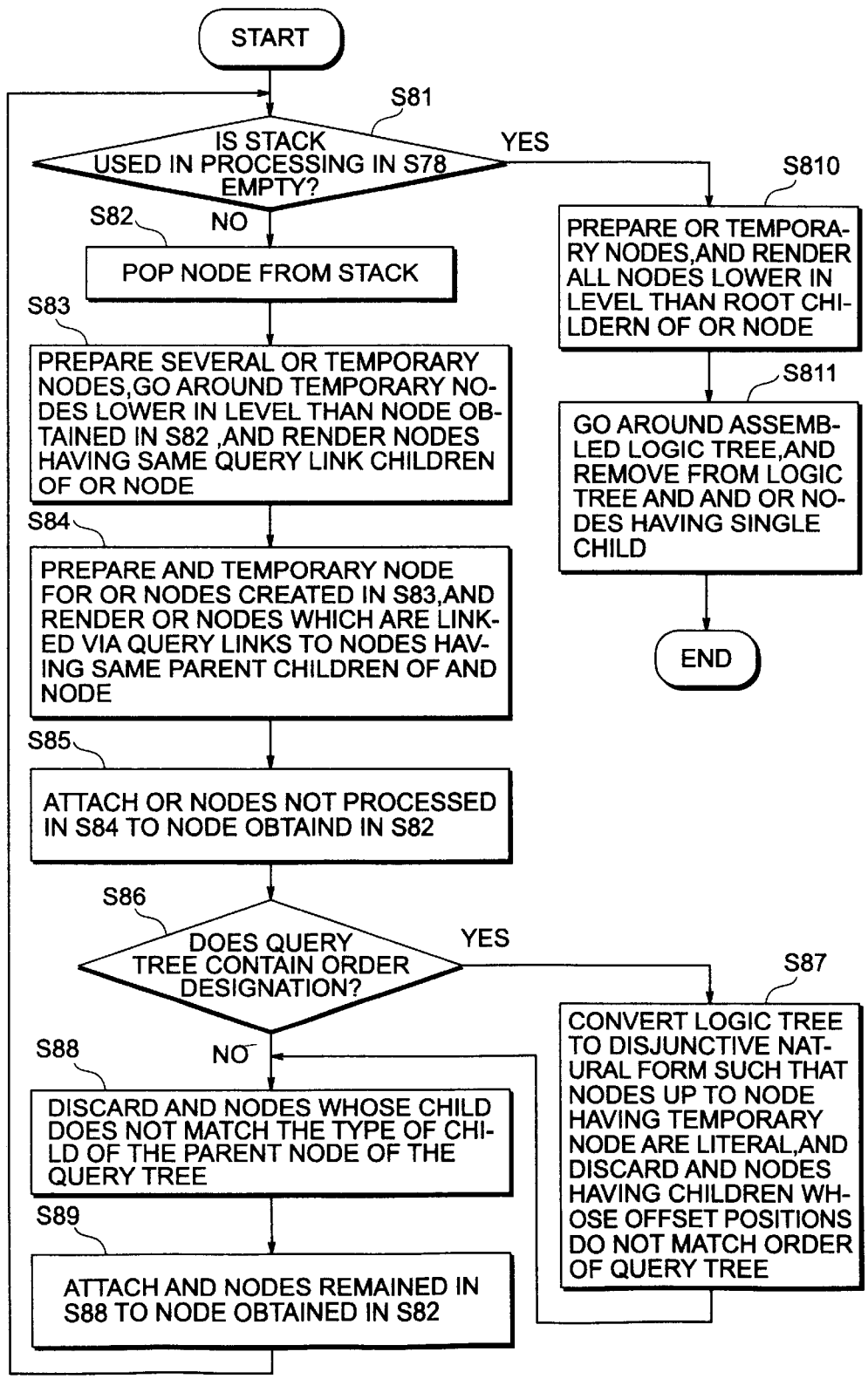
FIG. 11 is a flowchart showing the steps of processing for creating a Boolean logic tree.

FIG. 11 shows the steps of processing for creating a Boolean logic tree (details of the processing in step S62 of FIG. 9). This processing includes the following four stages.

1) Removing, one at a time, the nodes of the hierarchical index 13 from the stack created in step S78 of FIG. 10 (step S82) until the stack becomes empty (step S81);
2) Performing the processing in steps S83 to S89, which will be described below, for temporary nodes provided at a level lower than the removed node;
3) When the stack becomes empty, preparing an OR temporary node, and rendering all the temporary nodes provided at a level lower than the root node of the hierarchical index 13 children of the OR node; and
4) When any AND or OR node of the assembled logical tree has a single child node, linking the child node directly to the parent node, and removing the AND or OR node from the logic tree (step S811).

The processing performed for the temporary nodes described in the above stage 2) includes the following steps.

(a) Preparing at least one OR temporary node, and rendering nodes having the same query link children of the OR node (step S83);
(b) When a plurality of OR nodes are created in step S83, preparing an AND temporary node, and rendering OR nodes which are connected to nodes having the same parent node children of the AND node (step S84);
(c) Attaching temporary nodes which are not subjected to the processing in (a) and (b) above to a node removed from the stack (step S85);
(d) When the query tree includes designation of an order (step S86), re-forming the logic tree assembled in step S84 into a disjunctive normal form (a logic expression having a form of, for example, "A1 OR A2 OR A3 OR . . . ," and each term having a form "Ai=B1 AND B2 AND B3 AND . . . "), by use of a logic expression distribution rule "A AND (B OR C)=(A AND B) OR (A AND C)," discarding an AND node when the order of child nodes of the query tree does not match the order of offsets stored in nodes to which the temporary nodes have been attached (step 87) (however, the disjunctive normal form used here is such that nodes up to the nodes to which the temporary nodes have been attached are treated as being literal; and the logic tree is not re-formed to a formal disjunctive normal form); and
(e) When the type of a child of the parent node of the query tree does not match the type of a child of an AND node, discarding the AND node (step S88), and attaching to the node obtained through the processing in step S82 an AND node which was not discarded in step S88 (step S89).

Through the above-described processing, a Boolean logic tree is assembled. The thus-assembled logic tree is converted into a character string by means of the processing in step S63 shown in FIG. 9. In this conversion processing, the Boolean logic tree is gone around recursively while priority is given in the hierarchical direction; and child nodes of an AND node are output in the form of an AND expression, and child nodes of an OR node are output in the form of an OR expression. Further, the output of child nodes of each node is enclosed in parentheses. An example of a recursive pseudo program for performing the above conversion is shown below.

Conversion function for conversion of a logic tree to a character string

```
recursive conversion function (val node = root of the logic tree
at the beginning) {
    if((node == node) || (node == OR node)) {
        output left parenthesis;
        for (val child = destination of child link of
node; child;
                child = destination of sibling link of
        child) {
            if (other than the first child)
                output AND symbol or OR symbol;
            }
            recursive conversion function (child);
        }
        output right parenthesis;
        return;
    }
    output set of text-data matching condition and part-ID;
    return;
}
```

The steps of the processing for referencing the text index 15 by use of a Boolean expression obtained after the conversion to the Boolean expression are the same as those of processing performed in the full-text search engine, except that a set having a text-data matching condition and a part-ID is used as a search key.

The system shown in FIG. 1 having the above-described processing means operates as follows.

The system comprises a hierarchical index expressing a structure of each structured document; a text index used for referring to a document-ID of a document including a search key, on the basis of the search key composed of a part-ID and a character string in text data; means to receive or input a user's query in the form of a tree structure and for converting the query to a Boolean expression; and means to refer to the text index by use of the Boolean expression and for obtaining a document-ID corresponding to the query tree. Thus, the system can search structured documents while maintaining the high speed of conventional full-text search engines.

Since the processing steps shown in FIGS. 9 to 11 realize means to convert a user's query to a Boolean expression, a sibling relationship between document parts can be included in search conditions.

Since nodes having the same element name are obtained from the hierarchical index by use of an element link in step S73 shown in FIG. 10, a set of nodes having the same element name can be obtained at high speed. In the processing in step S76, an ancestor is found in the hierarchical index, while a parent link from a child node is followed. Therefore, there can be omitted the step of following sibling links between child nodes, which would be required in the case in which links are followed from a parent node to child nodes. In addition, since the hierarchical index holds the offset of each sibling node in a document, it becomes possible to change at the time of search whether the order of appearance of document parts having different element names is included in search conditions.

The system has means to register, for each document part, a special search key composed of a special character string and a part-ID in the text index. Thus, it becomes possible to perform search under search conditions including only the presence of a document part or parts, without changing the basic configuration of the conventional search engine.

The system includes means to create, for the text data of each document part, pseudo text data which are obtained through addition of special character strings at the start and end positions of the text data and for creating search keys from the pseudo text data in order to register the search keys in the text index. Thus, it becomes possible to select one of two matching means to match the text data; i.e., means to perfect-match the text data and means to partial-match the text data.

EXAMPLE 1

Next, an example in relation to documents having simple structures will be described. Documents 1 and 2, which were like those used in the "Description of the Related Art" section, are used here.

```
· Document 1
    <Document>
        <Part1> 構造化 </Part1>
        <Part2> 文書 </Part2>
        <Part3> 検索 </Part3>
    </Document>
· Document 2
    <Document>
        <Part2> 文書 </Part2>
        <Part1> 構造化 </Part1>
        <Part3> 検索 </Part3>
    </Document>
```

The example shows documents 1 and 2 which include the Chinese (or Kanji) character, which is ideogram, more concretely shows Japanese documents 1 and 2. In the example, the word or the characters "構造化" corresponds to the word "structuring", the word or the characters "文書" to the word "document", and the word or the characters "検索" to the word "retrieval". That is, the above example is a Japanese one used in the "Description of the Related Art" section. Since the Chinese character is a ideogram, two continuous Chinese characters "文書" has the same meaning with the word "document" composed of eight continuous characters, for example. That is, even bigram (two continuous characters) is effective as a characteristic element in such as the documents 1 and 2.

(1) Document Registration

Figure 12A:
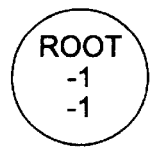
FIGS. 12A, 12B, 12C, 13A, and 13B are diagrams showing processing for registering documents having simple structures in the hierarchical index.
Figure 12B:
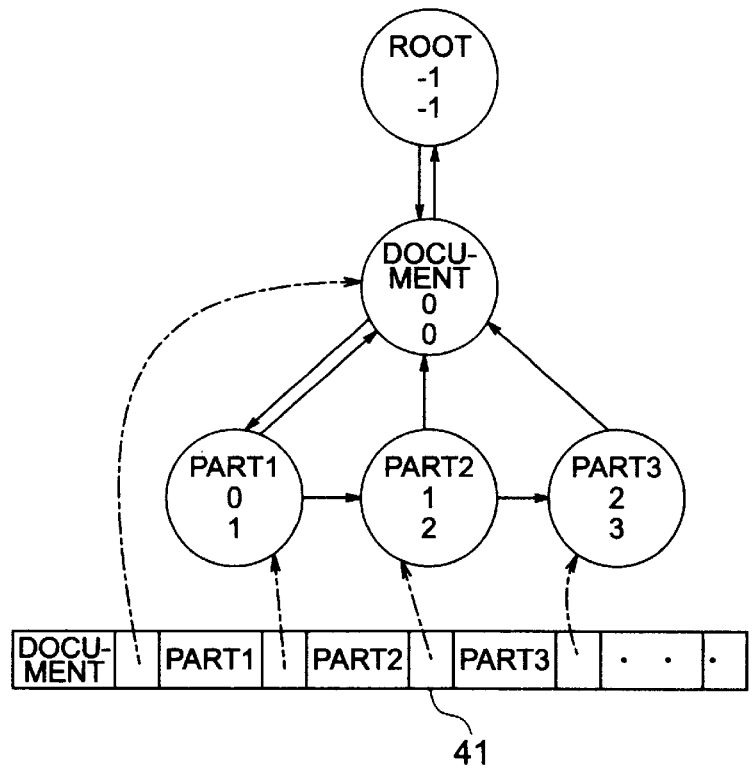
Figure 12C:
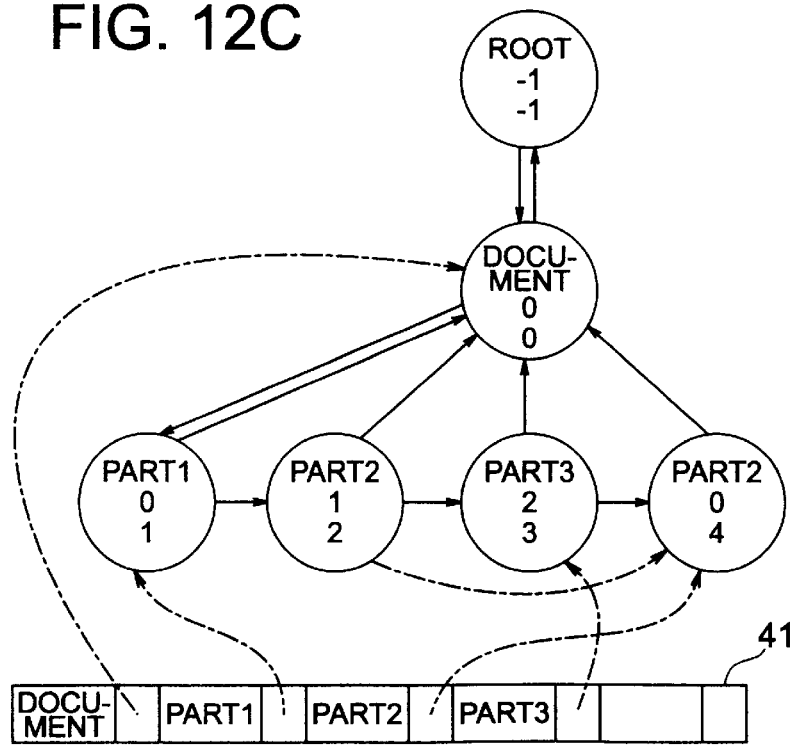

Example processing for registration of documents having simple structures will be described below. First, registration into the hierarchical index 13 will be described with reference to FIGS. 12 and 13. Through steps which will be described below, the above-described documents (Document 1 and Document 2) are untimely registered in the form of a hierarchical index which is the same as that shown in FIG. 2A.

1) The root node of the hierarchical index is created through the processing in step S11 shown in FIG. 3. The root node is created to have dummy values as an offset in sibling parts and a part-ID (see FIG. 12A).

2) During registration of Document 1, all the document parts are registered as new meta parts, because nothing has been registered in the hierarchical index. Further, through the processing in step S37 shown in FIG. 5, the respective names of document parts and links extending to the nodes are stored in a work buffer 41 (see FIG. 12B).

3) During registration of Document 2, no special processing is performed for a document part "Document," which serves as the root of Document 2, because there has already been registered a node which is identical with the document part "Document" in terms of upper meta part, element name, and offset in a row of sibling parts in the document.

Subsequently, "Part2," which is the first child of "Document," is judged to be a different meta part and is registered newly, because although a node which is identical in terms of upper meta part and element name has been registered, "Part2" differs from the registered node in terms of offset in a row of sibling parts. Further, in step S38 shown in FIG. 5, the element link of the node linked from the work buffer 41 is extended to the new node, and the new node is registered in the work buffer 41 (see FIG. 12C). This is because "Part2" has already been registered in the work buffer 41.

Figure 13A:
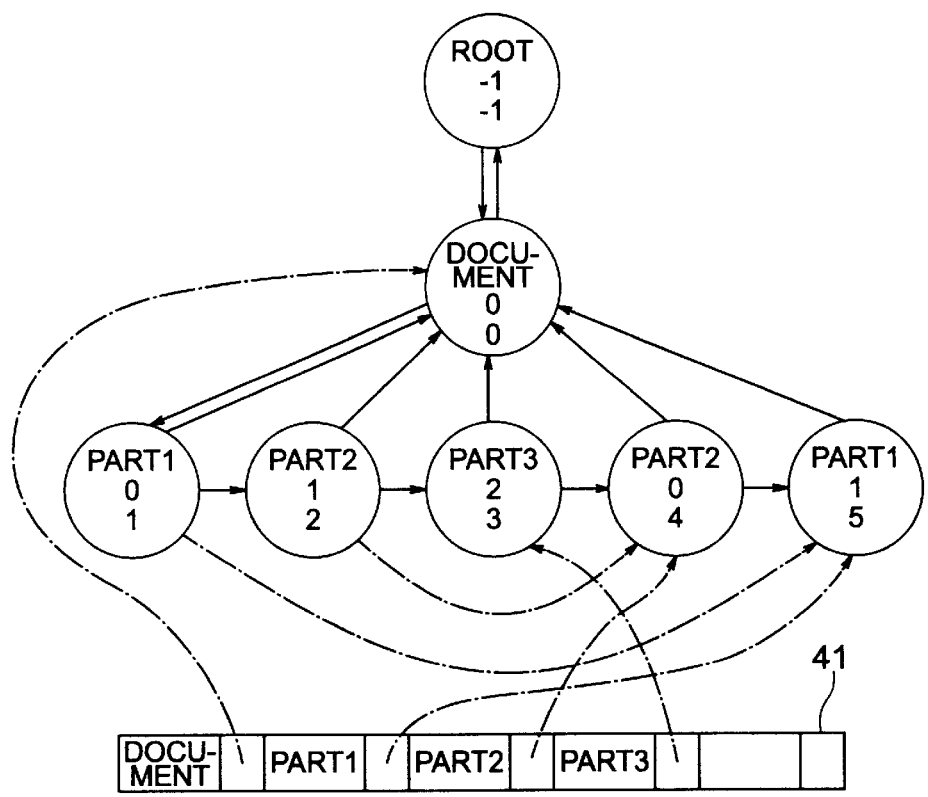
Figure 13B:
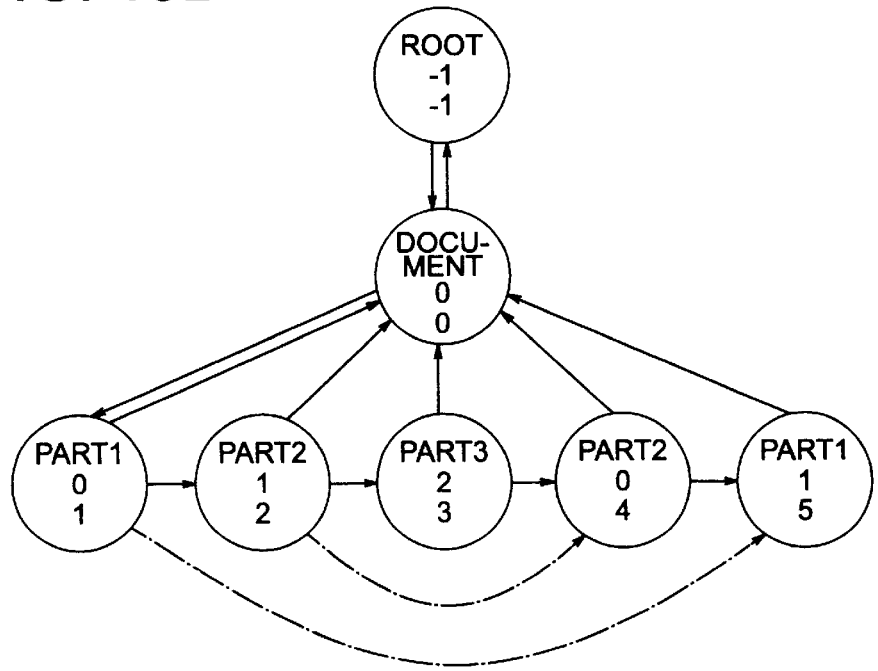

4) "Part1" of Document 2 is newly registered as in the case of "Part2." Re-formation of element links in the work buffer 41 is performed in a similar manner (see FIG. 13A).

5) No special processing is performed for "Part3" of Document 2, because there has already been registered a node which is identical with "Part3" in terms of upper meta part, element name, and offset in a row of sibling parts in the document. Further, since "Part3" is the last document part to be registered, the work buffer 41 is released, and the hierarchical index is completed ultimately (see FIG. 13B).

The processing for registering the above-described two documents in the text index 15 will be described with reference to FIG. 14. The example registration of documents in the text index shown in FIG. 14 is for the case in which:

An inverted file format is used;

Each characteristic element is extracted in the form of bigram, i.e. two continuous characters (since the above documents 1 and 2 are Japanese documents);

"??" is used as a special character string for expressing the presence of a structure "^" is used as a special character string to be added at the start position of text data; and "$" is used as a special character string to be added at the end position of the text data.

The inverted file form includes search keys 51 and document identifier lists 52, each of which is a list of the document-IDs of documents including the corresponding search key. A characteristic element and a part-ID of a document part in which the characteristic element is present are registered in the search key 51. In the document identifier list 52, the document-IDs of documents including each search key are registered in a row. If necessary, offsets and the number of times of appearance in each document are registered. FIG. 14 shows an example in which registration is performed in the form "document-ID: offset, . . . " For example, a search key in which "検索" is set as a characteristic element, and "3" is set as a part-ID corresponds to the document identifier list 52 including "1:8, 2:8." This means that the characteristic element "RE" appears at the 8th position of Document 1 and at the 8th position of Document 2.

A dummy value (−1 in the present embodiment) is set for the offset corresponding to the special key "??" for expressing the presence of a structure. A characteristic element "文書" "^文" and "書$" is for the word "文書" which has the meaning of "document". A characteristic element "検索", "^検" and "索$" is for the word "検索" which has the meaning of "retrieval". A characteristic element "構造" "造 化" and "^構" and "化$" is for the word "構造化" which has the meaning of "structuring".

The characteristic element is extracted in the form other than bigram (two continuous characters) which is shown in FIG. 14. The number of the character which comprises the characteristic element may be more than 3, or, for example, 3 to 6. The number of the character depends on the language of the document which is registered.

When the document which is registered is written by Japanese, the character number of the characteristic element is usually 1 or 2. This is owing to that Japanese character is ideogram which has a meaning with single character. Chinese which using Kanji character and other languages using ideogram are in a similar situation.

When the document which is registered is written by English, single word is usually used as single characteristic element. This is owing to that words are written in a divided form with blanks in English, and that English character is phonogram which does not have a meaning with single character, so that the N-gram division is not used in most cases. The languages belonging to the Indo-European family of language such as English using alphabet which is ideogram are in a similar situation.

(2) Search

Example processing for search of documents having simple structures will be described below. The following five search requests; i.e., Search Request 1 to Search Request #5, are taken as examples.

Search Request 1

In Search Request 1, a document including "Part1" as a document part is searched. An internal operation for converting Search Request 1 to a Boolean expression will be described with reference to FIGS. 15A, 15B, and 16.

Figure 15A:
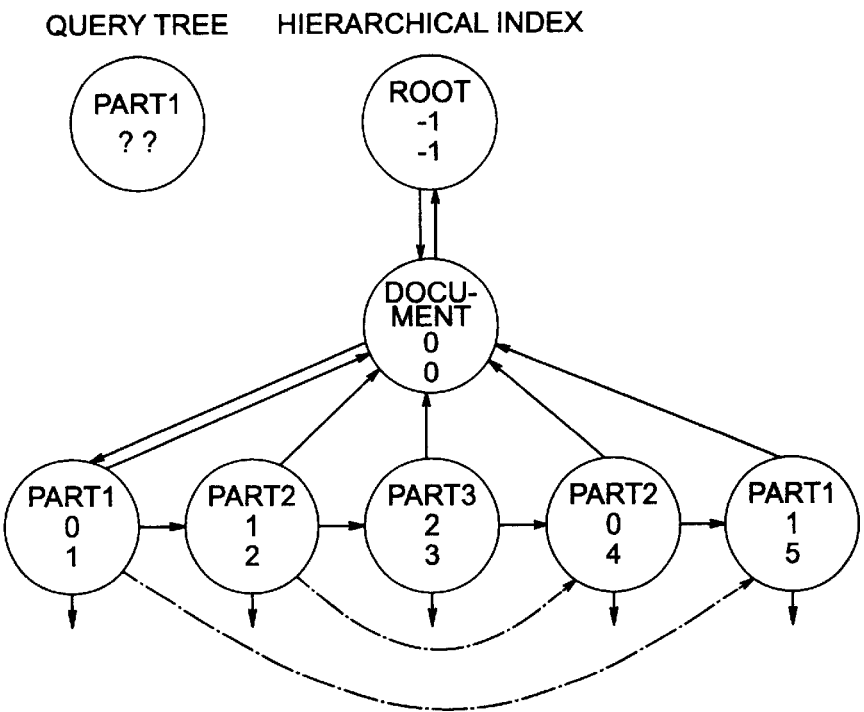
FIGS. 15A, 15B, and 16 are diagrams showing an internal operation for converting Search Request 1 to a Boolean expression.
Figure 15B:
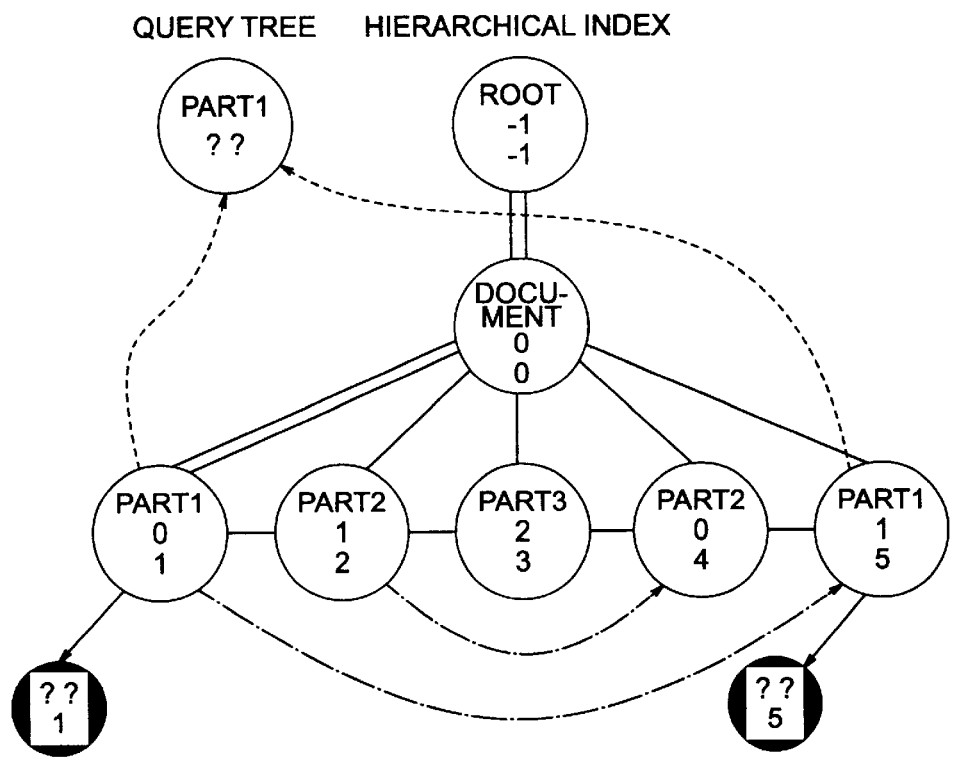
Figure 16:
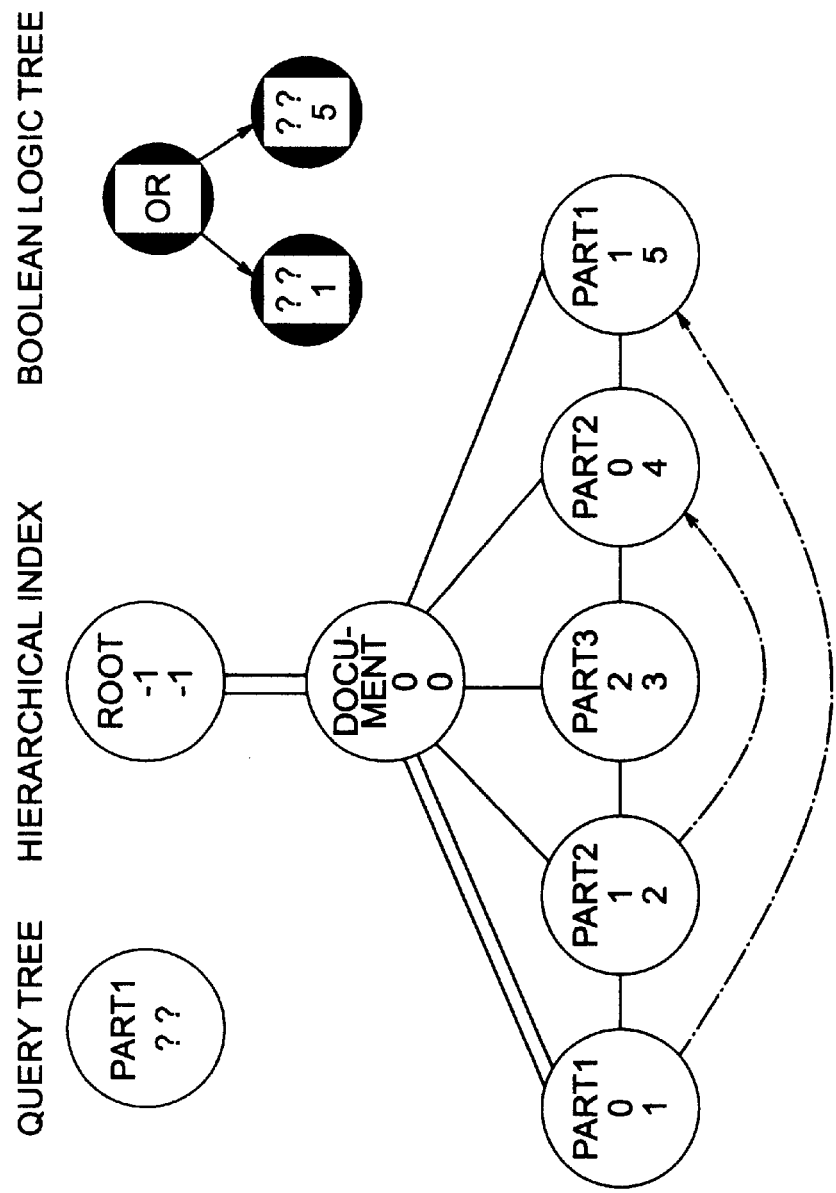

1) The query tree is formed of a single node; and, in the node of the query tree, "Part1" is stored as an element name, and "??" is stored as a text-data matching condition (see FIG. 15A).

2) Through the processing shown in FIG. 10, temporary nodes are attached to the nodes of "Part1" in the hierarchical index. Further, the query links of the nodes to which temporary nodes have been attached are linked to the node of the query tree (see FIG. 15B).

3) Since the query tree for Search Request 1 fail to satisfy the conditions of the processing in step S77 shown in FIG. 10, there is created a state in which nothing is present in the stack. Here, the conditions of the processing in step S81 shown in FIG. 11 are satisfied, and through processing in step S810, the temporary nodes provided in 2) above are rendered child nodes of an OR node in a Boolean logic tree (see FIG. 16).

4) The Boolean logic tree assembled in 3) above is converted to a character string by means of the processing in step S63 shown in FIG. 9, so that an ultimate Boolean expression is obtained. When one search key is described in the form of "search character string@part-ID", an OR operator in the form of "OR", an AND operator in the form of "AND", and parentheses symbols in the form of "("and")", the ultimate Boolean expression assumes the form of a character string as follows.

(??@1 OR ??@5)

The text index shown in FIG. 14 is referred to by use of the thus-obtained Boolean expression, so that document-IDs "1" and "2" are obtained as a search result.

Search Request 2

Figure 17A:
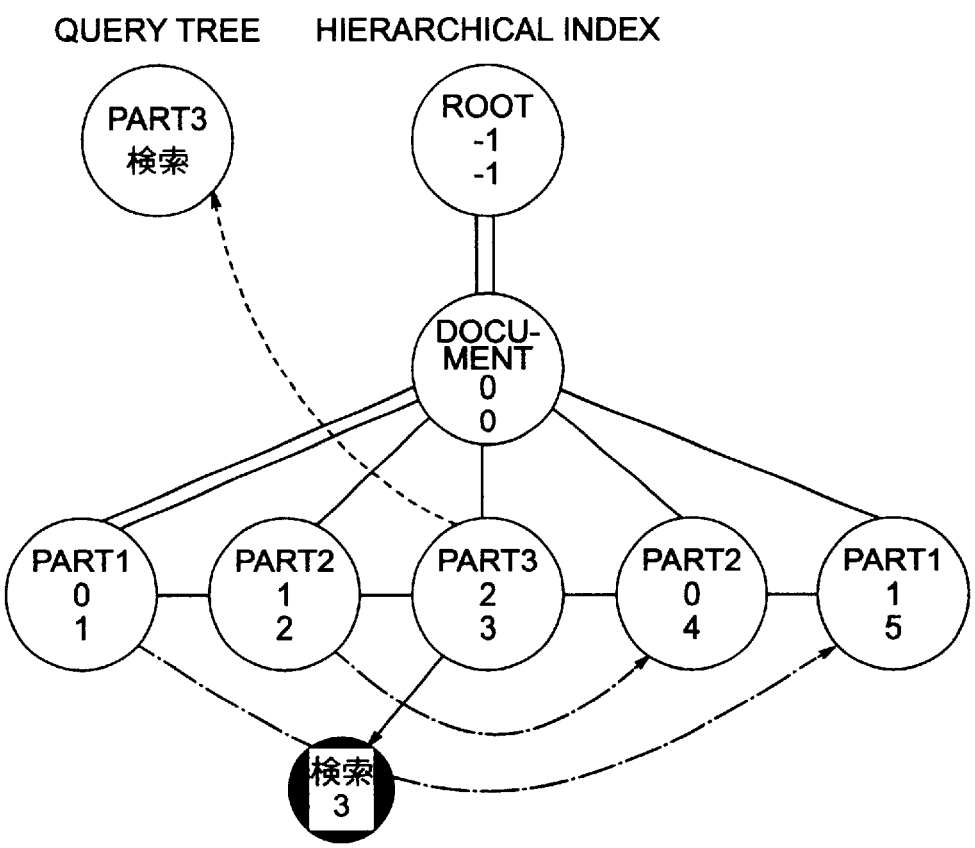
FIGS. 17A to 17C are diagrams showing an internal operation for converting Search Request 2 to a Boolean expression.
Figure 17B:
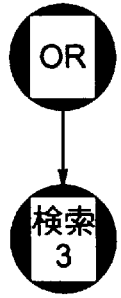
Figure 17C:

In Search Request 2, a document whose "Part3" includes the Chinese character "検索" which has the meaning of "retrieval", as a portion of its text data is searched (partial match). An internal operation for converting Search Request 2 to a Boolean expression will be described with reference to FIGS. 17A to 17C.

1) The query tree is formed of a single node; and, in the node of the query tree, "Part3" is stored as an element name, and "検索" is stored as a text-data matching condition.

2) Through the processing shown in FIG. 10, a temporary node is attached to the node of "Part3" in the hierarchical index. Further, the query link of the nodes to which a temporary node has been attached is linked to the node of the query tree (see FIG. 17A).

3) Since the query tree for Search Request 2 also fails to satisfy the conditions of the processing in step S77 shown in FIG. 10, there is created a state in which nothing is present in the stack. Here, the conditions of the processing in step S81 shown in FIG. 11 are satisfied, and through processing in step S810, the temporary nodes provided in 2) above are rendered child nodes of an OR node (see FIG. 17B).

4) The form of the Boolean logic tree assembled in 3) above is regulated by means of the processing in step S811 shown in FIG. 11, and is converted to a character string by means of the processing in step S63 shown in FIG. 9, so that the following Boolean expression is obtained ultimately.

(検索@ 3)

The text index shown in FIG. 14 is referred to by use of the thus-obtained Boolean expression, so that document-IDs "1" and "2" are obtained as a search result.

Search Request 3

In Search Request 3, a document whose "Part3" includes the Chinese character "検索" which has the meaning of "retrieval", as its text data is searched (complete match). Searching performed under the condition of complete match of text data is realized through processing which is identical with that for the above-described Search Request 2, except that the text-data matching condition of the query tree becomes "^検索$", and the following Boolean expression is obtained ultimately.

("^検索S@3)

When the search character string is divided into a plurality of characteristic elements as described above, a mere reference of the text index shown in FIG. 14 is insufficient, and the offsets of the respective characteristic elements must be checked in order to determine whether they are arranged in a single line.

In the above-described Boolean expression,

"^検" appears at the 7th position of Document 1, and at the 7th position of Document 2;

"検索" appears at the 8th position of Document 1, and at the 8th position of Document 2;

"索S" appears at the 9th position of Document 1, and at the 9th position of Document 2; and these are arranged in a single line. Therefore, document-IDs "1" and "2" are obtained as a search result.

Search Request 4

In Search Request 4, a document which includes "Part1" and "Part2" as children of "Document" and in which the text data of "Part1" includes the Chinese character "構造" which has the meaning of "structure", is searched (search of a sibling relationship between document parts without conditions in relation to the order of siblings).

An internal operation for converting Search Request 4 to a Boolean expression will be described with reference to FIGS. 18A to 21C.

Figure 18A:
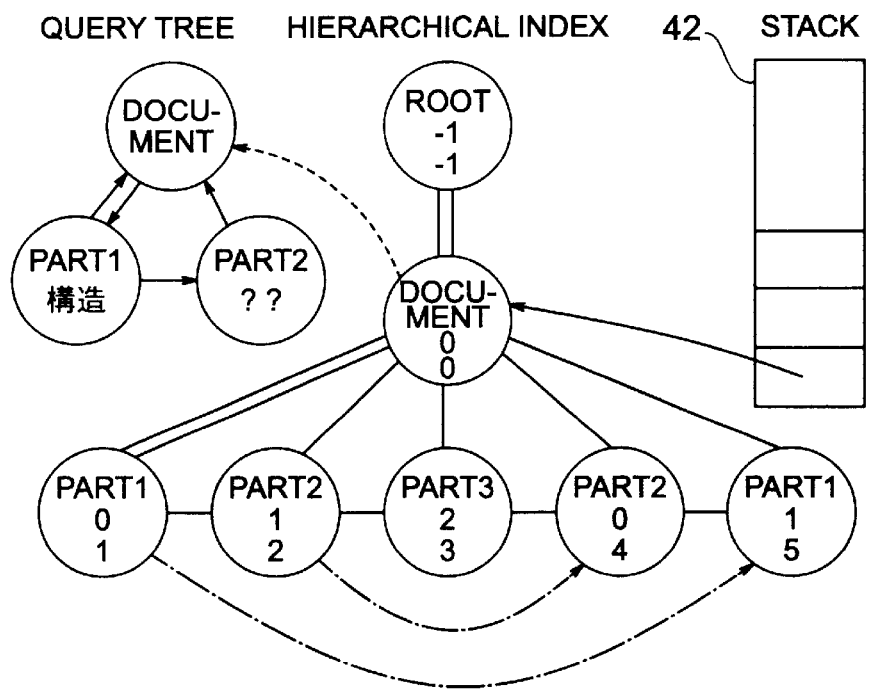
Figure 18B:
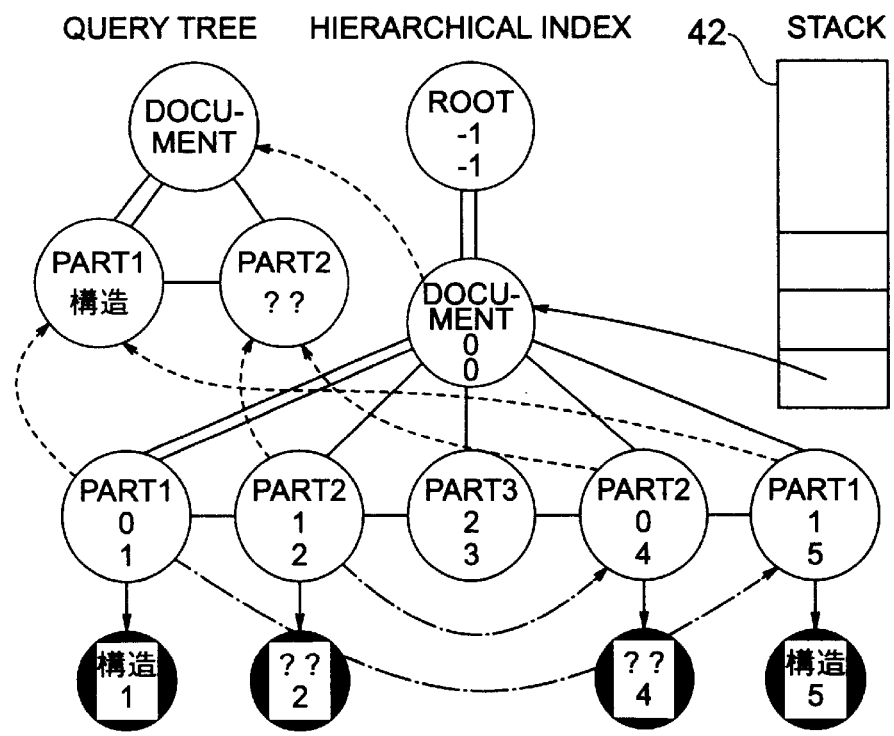

1) As shown in FIG. 18A, the query tree is formed of three nodes; and the respective nodes store the following data:

Element name: "Document", text-data matching condition: none (no text-data matching condition is required to be set for the parent node of the query tree);

Element name: "Part1", text-data matching condition: "構造" and

Element name: "Part2", text-data matching condition: "?!";

For these nodes, the processing shown in FIG. 10 is performed, while the priority is given in their depth.

2) First, the node having the element name "Document" is first processed. Since the conditions of the processing in step S77 shown in FIG. 10 are satisfied, through processing in step S78, through processing in step S78, the corresponding node of the hierarchical index is stored in the stack 42. Further, through processing in step S79, the query link of the node stored in the stack 42 is extended to the corresponding node of the query tree (see FIG. 18A).

3) Subsequently, the node having the element name "Part1" is processed, and temporary nodes are attached to the nodes of "Part1" through processing in step S711. The nodes having an element name "Part2" are processed in a similar manner (see FIG. 18A).

4) Since one node is stored in the stack 42, this node is removed from the stack 42 through processing in step S82 shown in FIG. 11.

Figure 19:
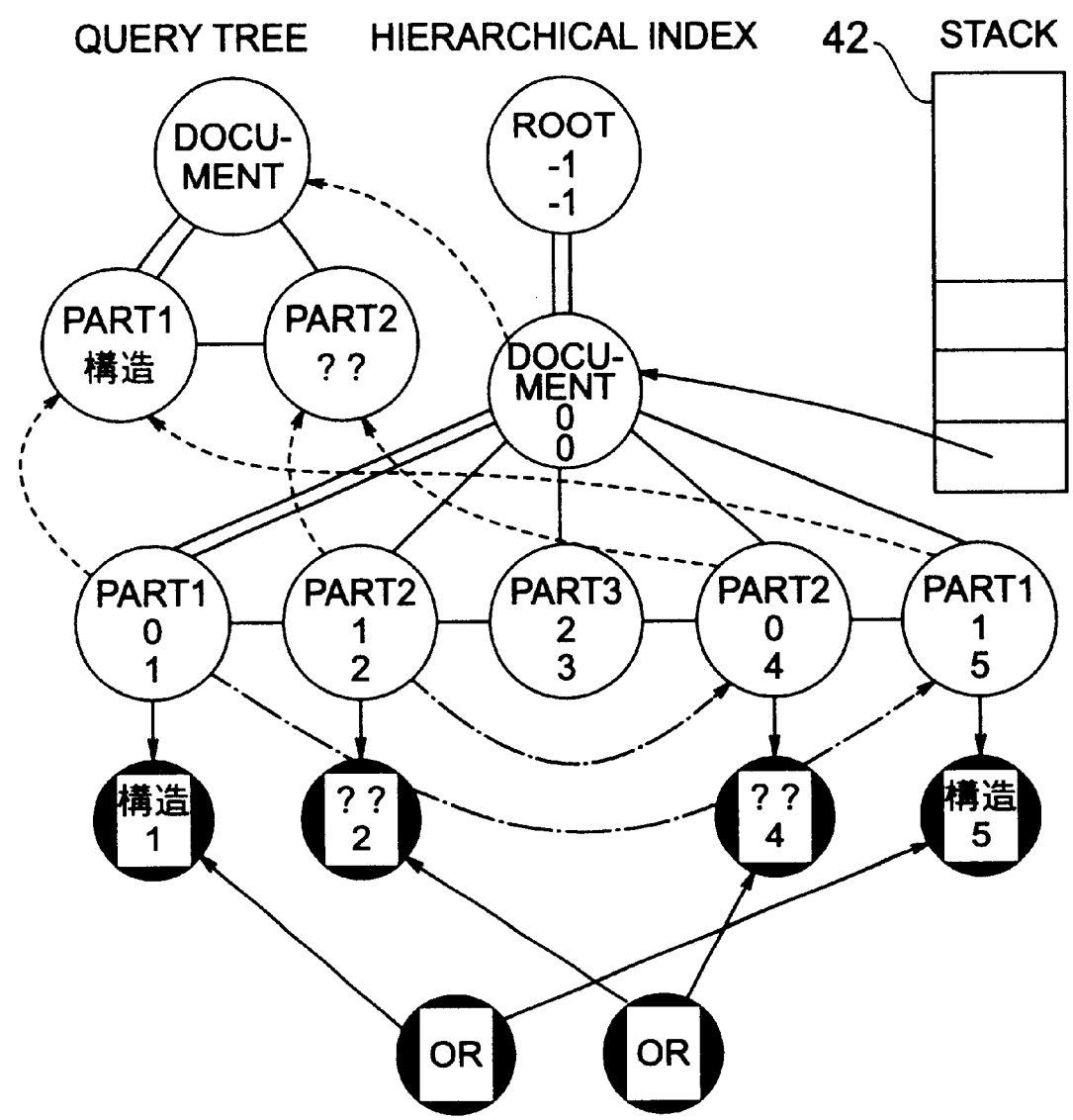

5) The processing in step S83 is performed for temporary nodes lower in level than the removed node, in order to render temporary nodes having the same query link child nodes of an OR node (see FIG. 19).

Figure 20:
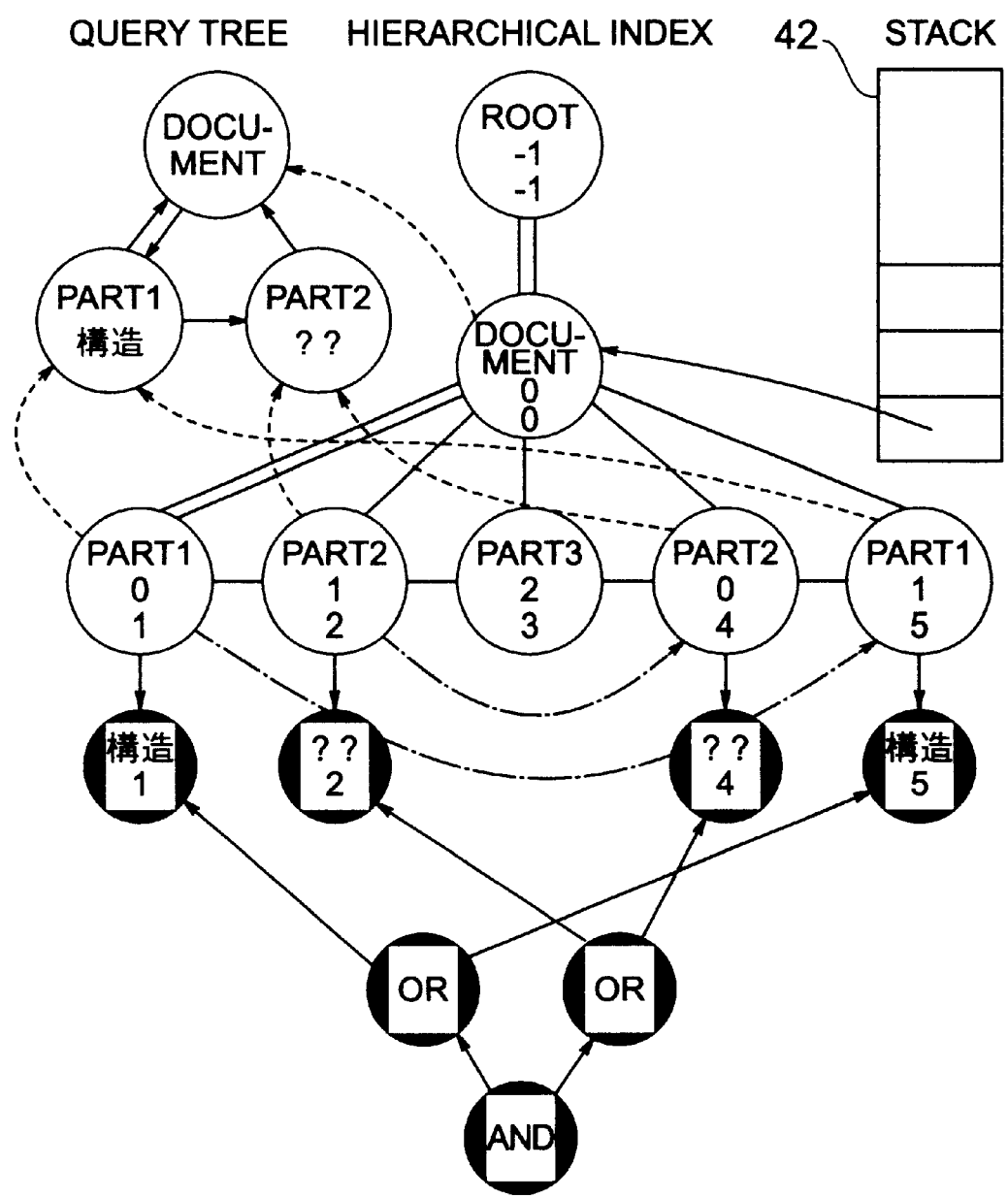

6) Subsequently, through the processing in step S84, among the above-described OR nodes, OR nodes which are linked, via query links, to nodes which share the same parent node are rendered child nodes of an AND node (see FIG. 20).

7) Since search conditions do not contain the "sibling order relationship," the processing in step S87 is not performed, and through the processing in step S89, the above-described AND node is attached to the node removed from the stack 42 (see FIG. 21A).

8) Since the stack 42 becomes empty at this point in time, through processing in step S810, the AND node described in 7) above is rendered a child node of an OR node (see FIG. 21B).

9) The form of the Boolean logic tree assembled in 8) above is regulated by means of the processing in step S811 shown in FIG. 11. Subsequently (see FIG. 21C), the Boolean logic tree is converted to a character string by means of the processing in step S63 shown in FIG. 9, so that the following Boolean expression is obtained ultimately.

((構造@1 OR 構造@5) AND (??@2 OR ??@4))

The text index shown in FIG. 14 is referred to by use of the thus-obtained Boolean expression, so that document-IDs "1" and "2" are obtained as a search result.

Search Request 5

In Search Request 5, a document which includes "Part1" as a child of "Document" and in which "Part2" follows and the text data of "Part1" includes the Chinese character "構造" which has the meaning of "structure", is searched (search of a sibling relationship between document parts with conditions in relation to the order of siblings).

Search performed under search conditions which include not only a sibling relationship between document parts but also the order of siblings is realized through addition of the processing in step S87 shown in FIG. 11 to the processing for Search Request 4. Therefore, the processing up to step 87 is the same as that for Search Request 4.

Figure 22:
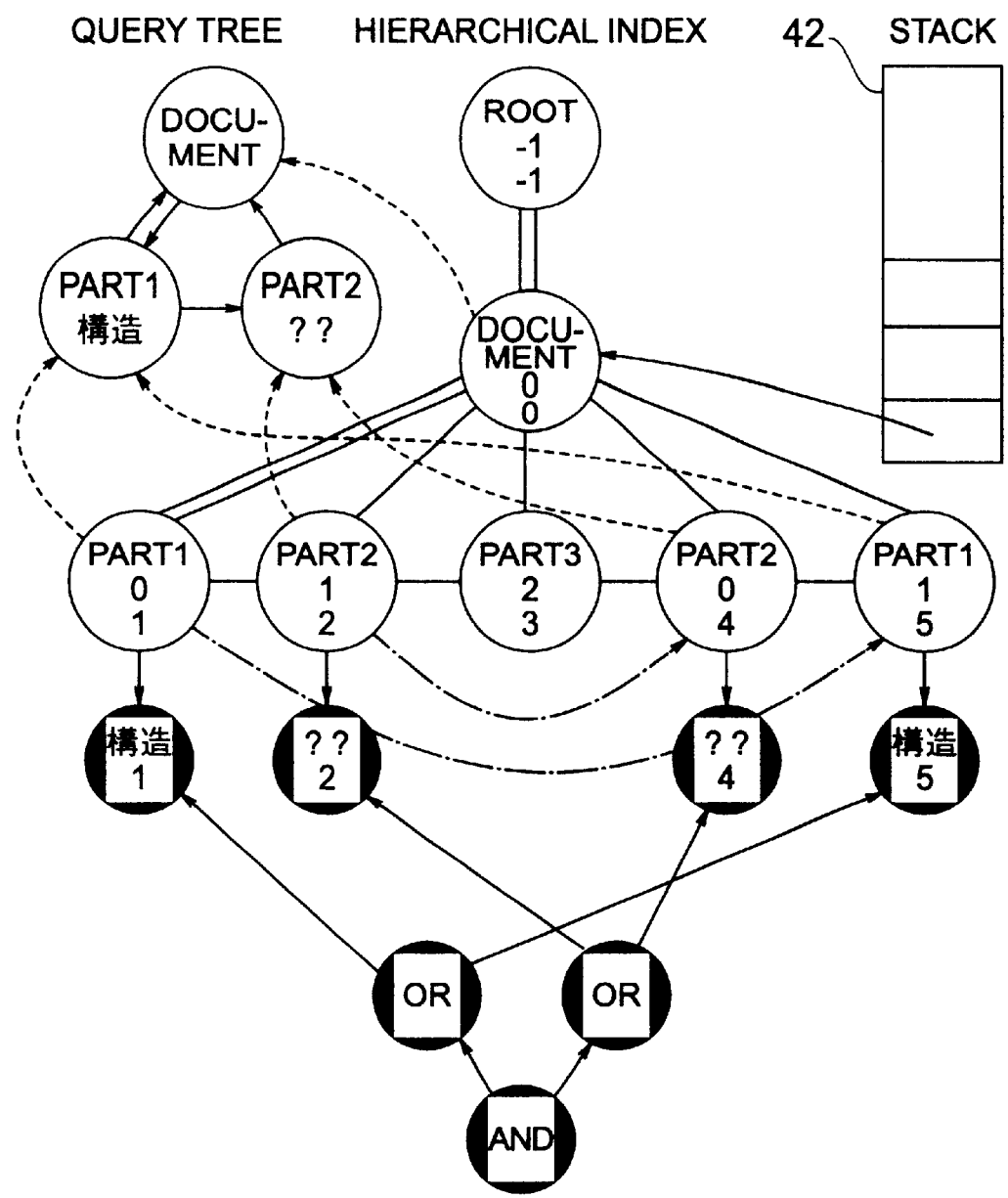
FIGS. 22 to 24B are diagrams showing an internal operation for converting Search Request 5 to a Boolean expression.

1) As in the case of Search Request 4, temporary nodes are attached to the nodes of "Part1" and "Part2," and the node corresponding to the parent node of the query tree is stored in the stack 42. Further, through processing in steps S83 and 84, a logic expression including OR nodes and an AND node is assembled (see FIG. 22).

Figure 23:
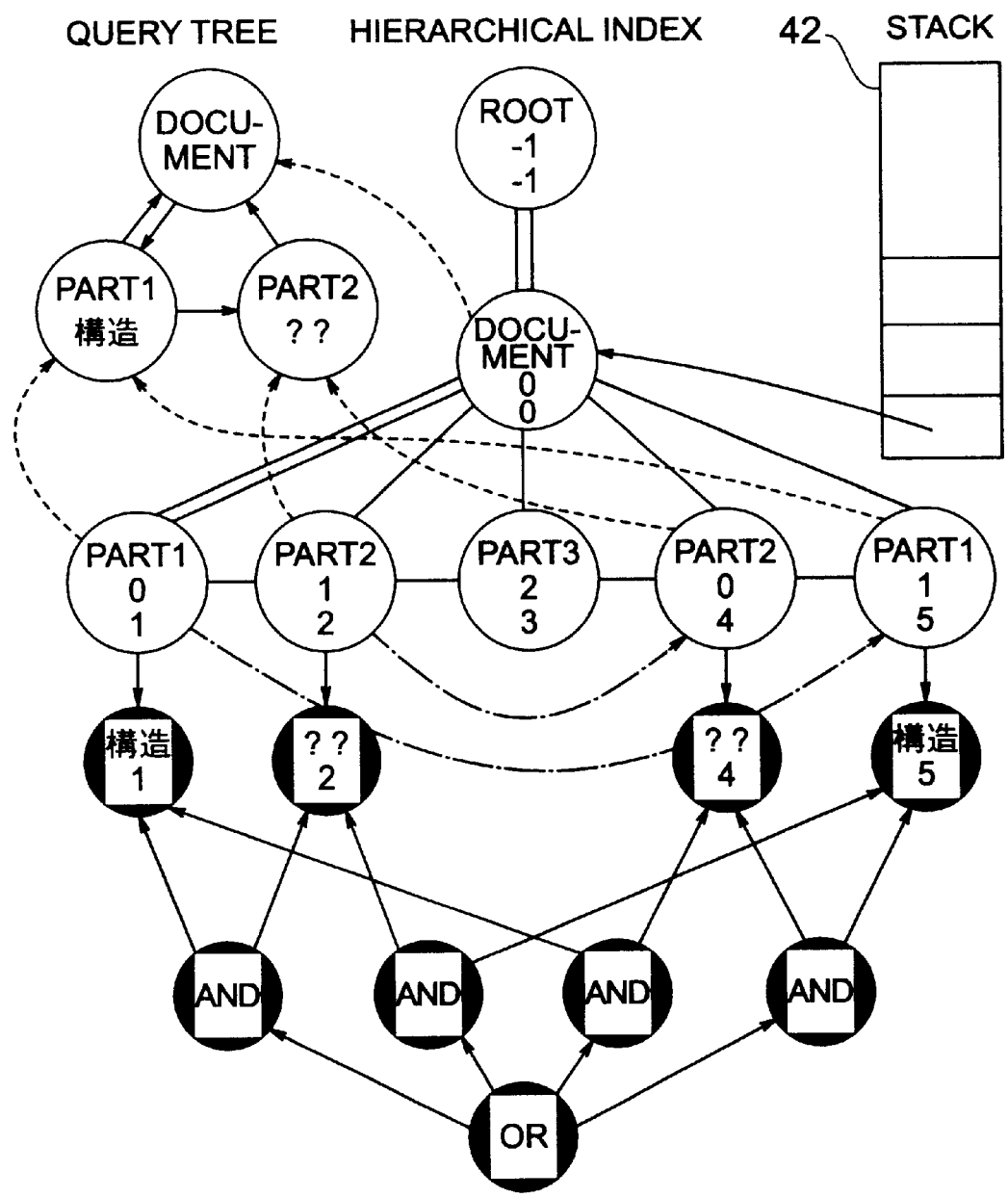

2) Through processing in step S87 shown in FIG. 11, the links among the OR and AND nodes are re-formed in accordance with a logic expression distribution rule, so that the logic expression is converted into the disjunctive normal form (see FIG. 23).

Figure 24A:
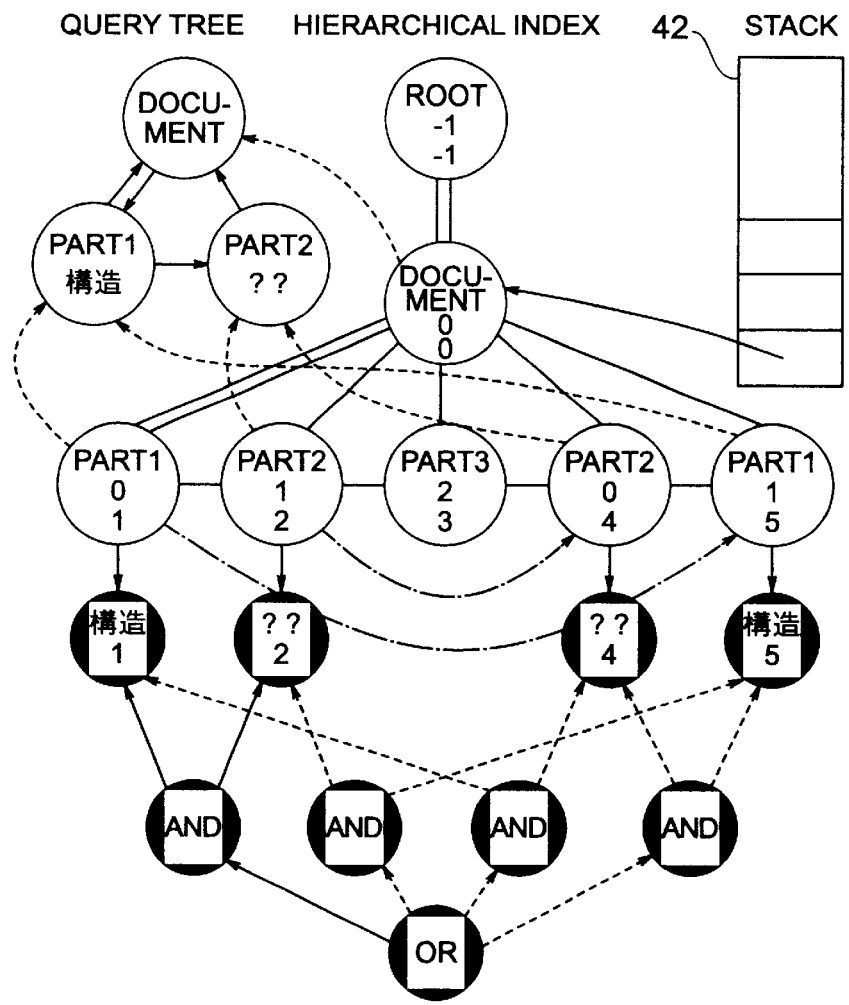

3) With reference to information regarding the offsets of the nodes of the hierarchical index, to which nodes are attached the children nodes of each of the AND nodes, an AND node or nodes which is in FIG. 23 and fail to satisfy the sibling relationship with order are discarded. In the example shown in FIG. 23, only the leftmost AND node satisfies the sibling relationship with order, and therefore, the remaining AND nodes are discarded (See FIG. 24A).

Figure 24B:
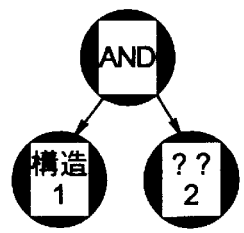

4) The processing in step S87 and subsequent steps is the same as the case of Search Request 4. That is, upon completion of the processing in step S811 shown in FIG. 11, the logic tree shown in FIG. 24B is obtained. The logic tree is converted to a character string by means of the processing in step S63 shown in FIG. 9, so that the following Boolean expression is obtained ultimately.

((構造@1 AND ??@2)

The text index shown in FIG. 14 is referred to by use of the thus-obtained Boolean expression, so that document-ID "1" is obtained as a search result.

EXAMPLE 2

Next, processing for conversion into a Boolean expression of a query tree including designation of a multi-level sibling relationship will be described. Even when documents having more complex structures are processed, the fundamental processing is the same as in the above-described case in which documents having simple structures are processed. Only the structure of the hierarchical index and the internal operation for conversion of a query tree to a Boolean expression become complex. An embodiment for documents having complex structures will be described with reference to an example case in which the following three documents (Document 1, Document 2, and Document 3) are processed.

```
· Document 1
    <Document>
        <Title> STRUCTURED-DOCUMENT SEARCH </Title>
        <Author>
            <Name> YAMADA TARO </NAME>
            <Section> SHIBUYA RESEARCH CENTER </Section>
        </Author>
    </Document>
· Document 2
    <Document>
        <Title> FULL-TEXT SEARCH ENGINE </Title>
        <Author>
            <Name> YAMADA TARO </NAME>
            <Section> SHIBUYA RESEARCH CENTER </Section>
        </Author>
        <Author>
            <Name> SUZUKI HANAKO </NAME>
            <Section> SHINJUKU RESEARCH CENTER </Section>
        </Author>
    </Document>
· Document 3
    <Document>
        <Author>
            <Name> YAMADA TARO </NAME>
        </Author>
        <Author>
            <Name> SUZUKI HANAKO </NAME>
            <Section> SHIBUYA RESEARCH CENTER </Section>
        </Author>
        <Title> MANAGEMENT OF STRUCTURED DOCUMENTS </Title>
    </Document>
```

Figure 25:
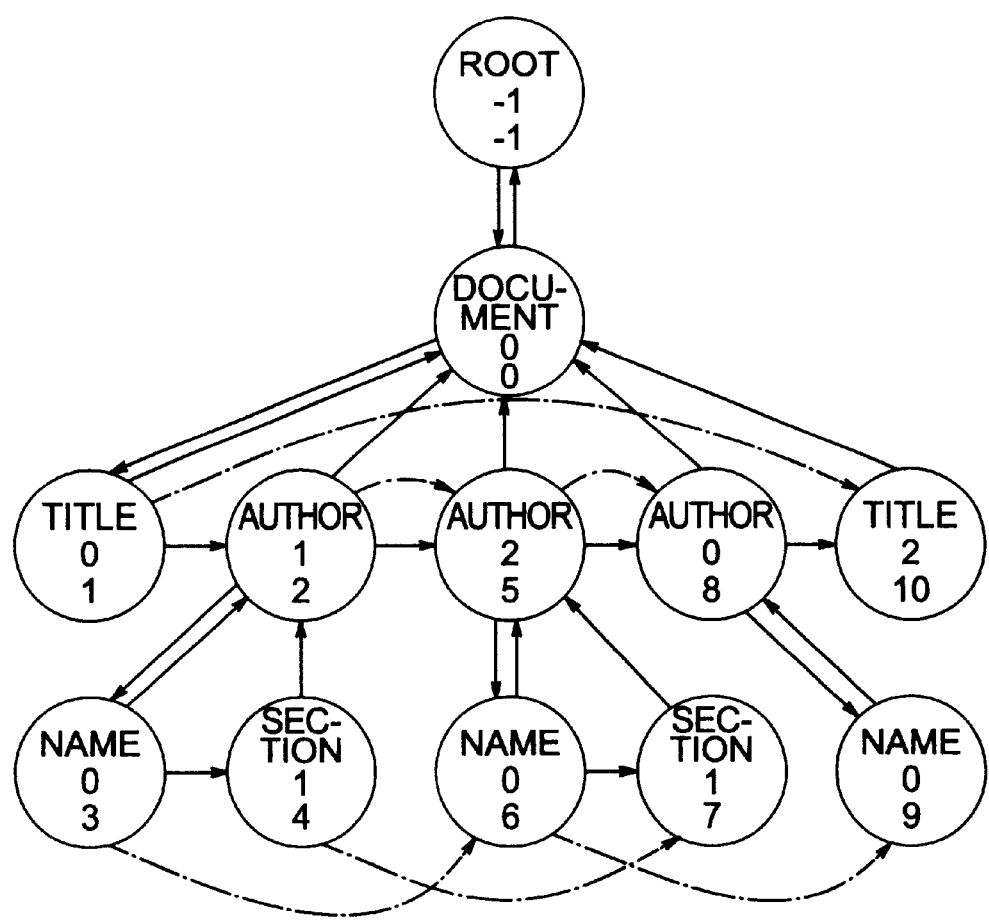
FIG. 25 is a diagram showing example registration of documents having complex structures in the hierarchical index.
Figure 26:
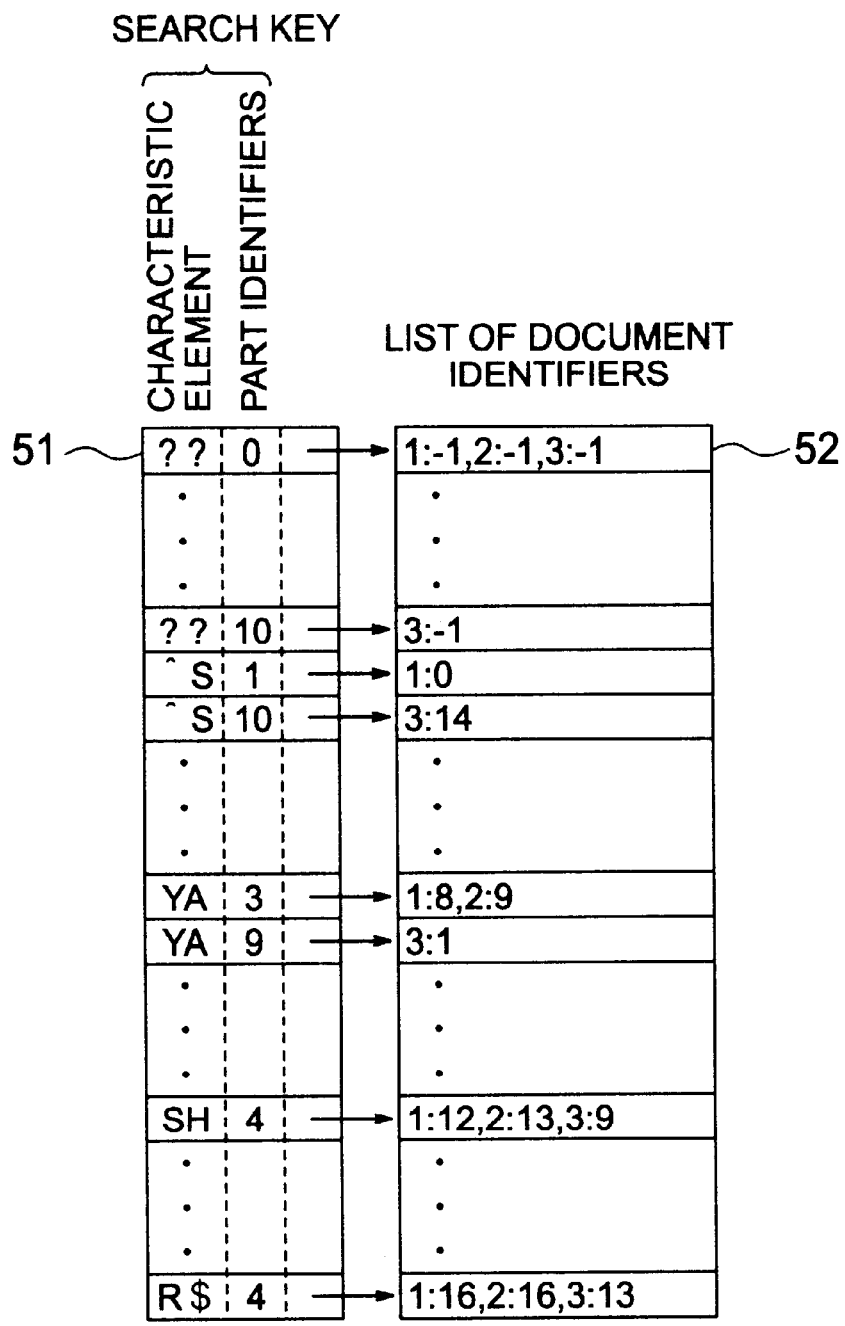
FIG. 26 is a diagram showing example registration of documents having complex structures in the text index.

Among the above example documents, Document 2 includes repeated elements, and Document 3 includes a deficiency of an element. FIG. 25 shows the hierarchical index 13 in which the above-described three documents are registered. FIG. 26 shows a portion of data registered in the text index 15. The form of the text index is the same as that in the case of the example for documents having simple structures (FIG. 14).

An internal operation for converting each of the following search requests to a Boolean expression will be described with reference to FIGS. 27 to 32. When a document is written in English, a characteristic element is usually extracted in a form of single word. However, in the example shown in FIGS. 27 to 32, bigram (two continuous characters) is used as the characteristic element to simplify the explanation.

Search Request 6

In Search Request 6, a document which is written by "Author" who is defined such that "Name" is "YAMADA TARO" and "Section" is "SHIBUYA RESEARCH CENTER" and in which "Title" includes "STRUCTURED DOCUMENT" is searched. The sibling order relationship between document parts is ignored.

Figure 27:
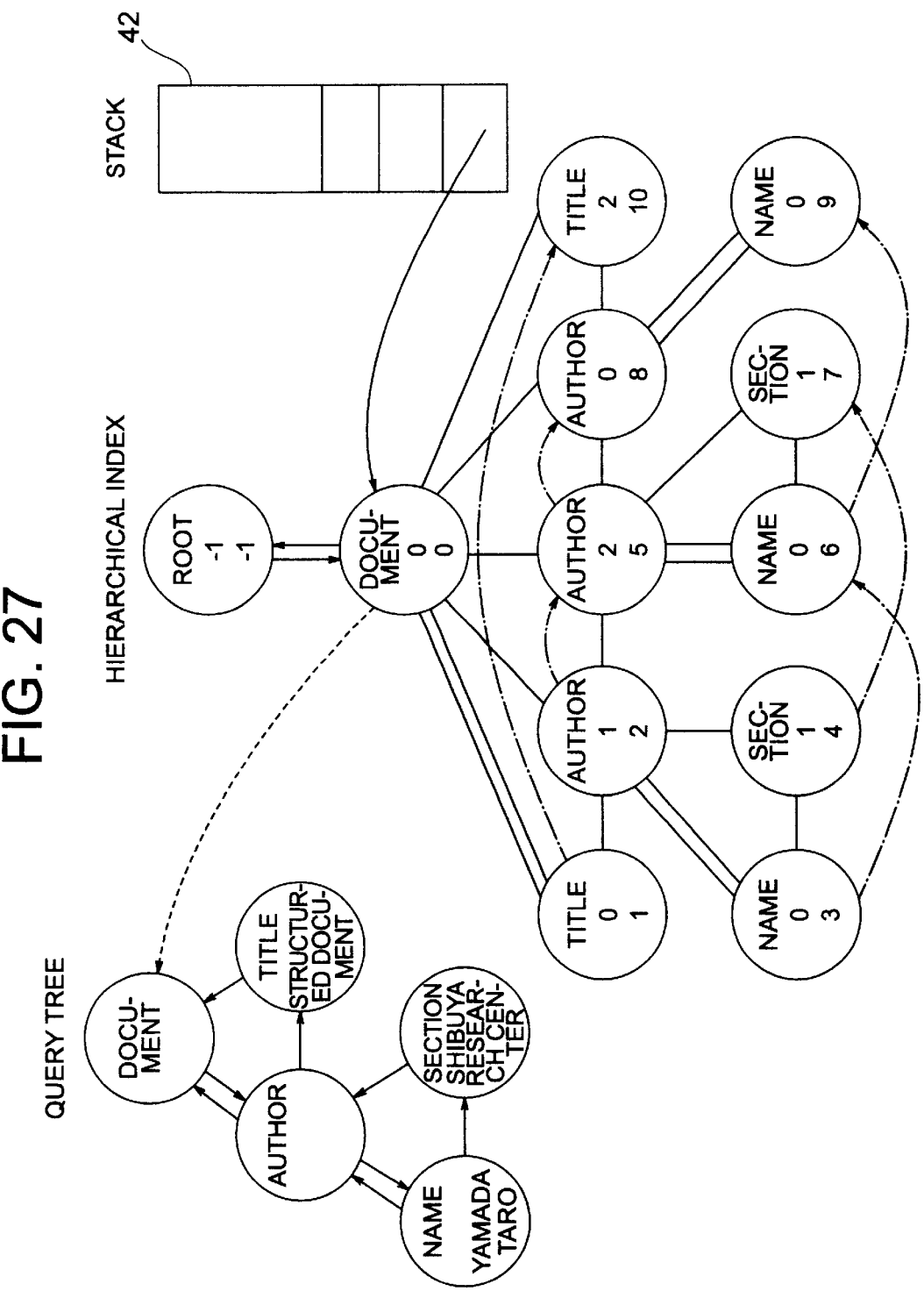
FIGS. 27 to 32 are diagrams showing an internal operation for converting Search Request 6 to a Boolean expression.
Figure 28:
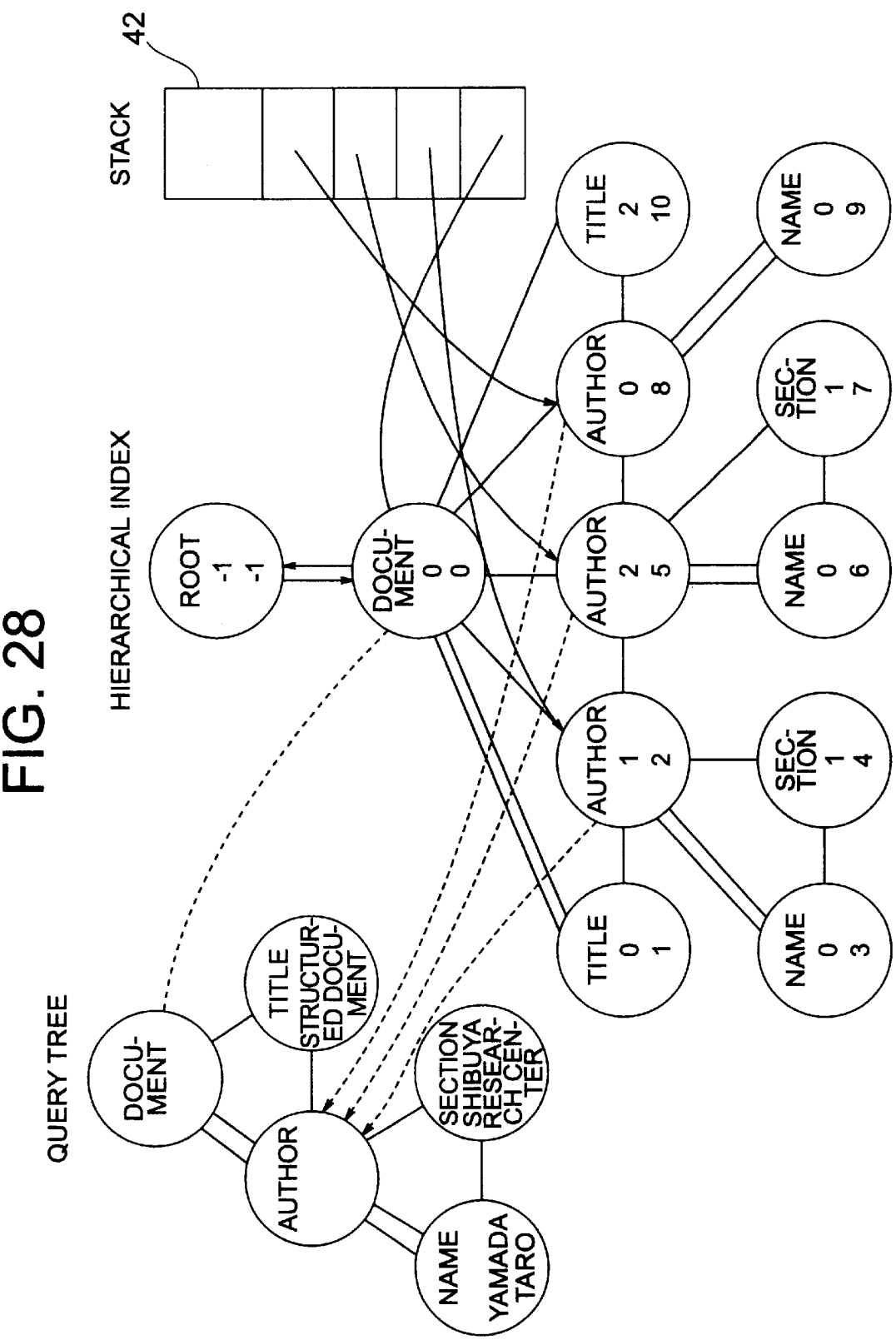

1) As shown in FIG. 27, the query tree is formed of five nodes and includes a two-level sibling relationship such that the "Author" node is a parent of the "Name" node and the "Section" node, and the "Document" node is a parent of the "Author" node and the "Title" node. First, the "Document" node is processed. Since the "Document" node satisfies the conditions of the processing in step S77 shown in FIG. 10, the corresponding node of the hierarchical index is pushed into the stack 42 (see FIG. 27).

2) Next, the "Author" node is processed, so that the corresponding nodes of the hierarchical index are pushed into the stack 42 as in the case of the "Document" node. The order in which corresponding nodes are pushed into the stack 42 is the reverse of the order in which the element links are followed (see FIG. 28).

Figure 29:
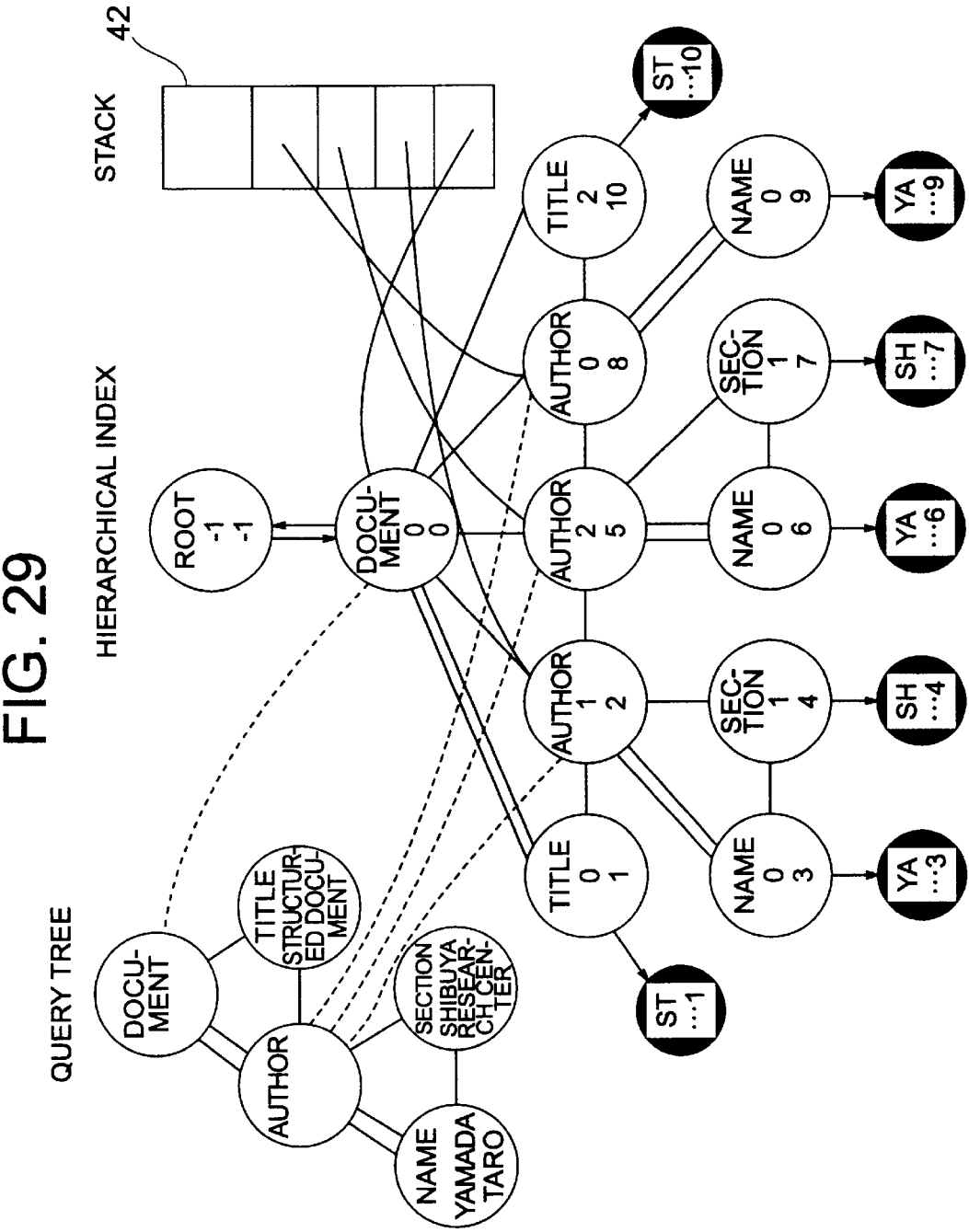
Figure 30:
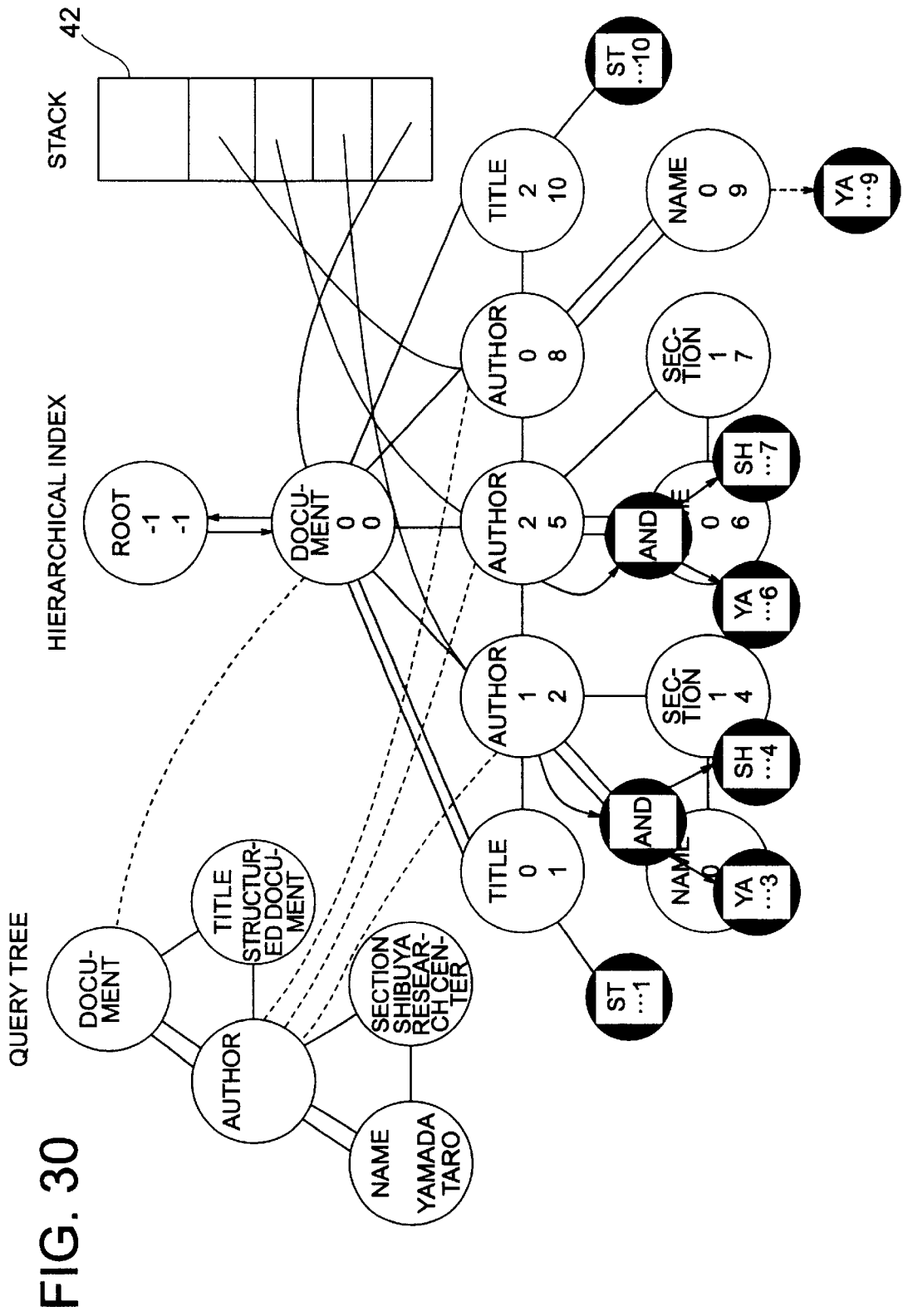

3) Subsequently, the "Name" node, the "Section" node, and the "Title" node are processed, in this sequence, and temporary nodes are attached to the corresponding nodes of the hierarchical index (see FIG. 29). In the example shown in FIG. 29, links which will not be described are omitted in order to simplify the description.

4) The nodes stored in the stack 42 are removed successively, and temporary nodes under the node just removed are rendered child nodes of OR and AND nodes. At this time, since the nodes under node (element name: "Author"/offset: 0/part-ID: 8) fail to satisfy the conditions of AND nodes defined in the processing in step S88 shown in FIG. 11, the nodes under the node (element name: "Author"/offset: 0/part-ID: 8) are discarded (see FIG. 30).

Figure 31:
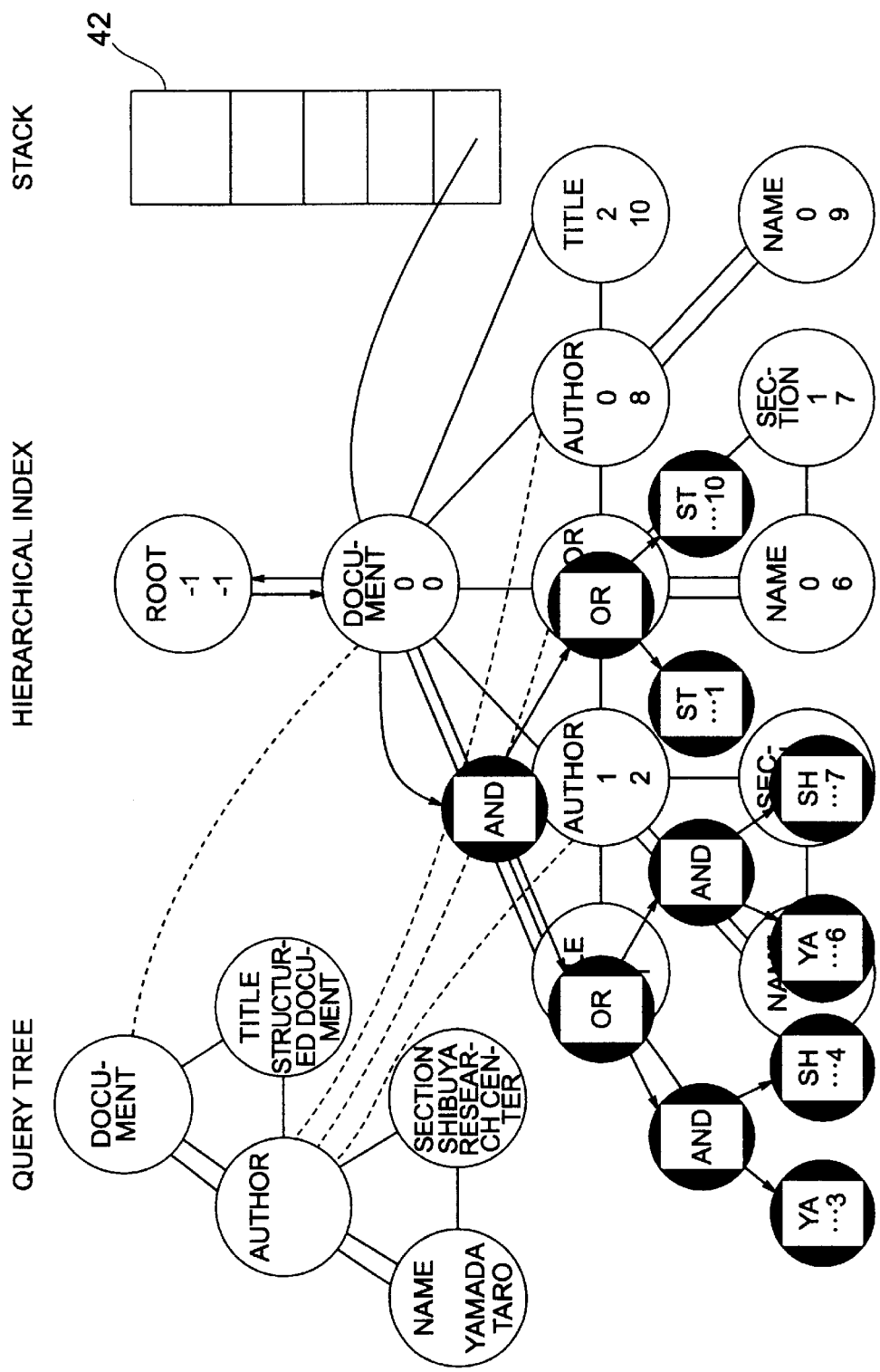

5) Subsequently, through the processing in steps S83 and S84 shown in FIG. 11, temporary nodes lower in level than the node of the hierarchical index corresponding to the "Document" node are rendered child nodes of OR and AND nodes (see FIG. 31).

Figure 32:
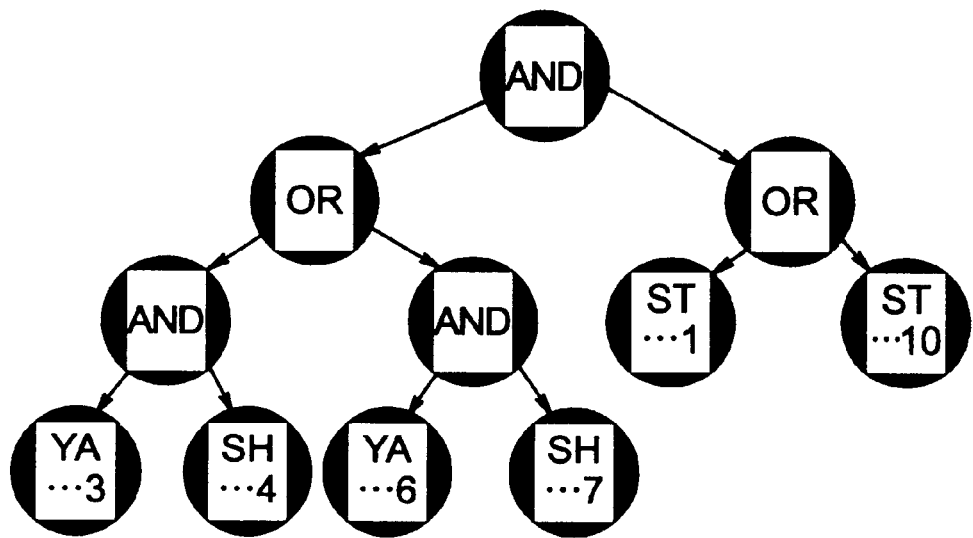

6) Upon completion of the processing in step S811 shown in FIG. 11, the logic tree shown in FIG. 32 is obtained. The logic tree is converted to a character string by means of the processing in step S63 shown in FIG. 9, so that the following Boolean expression is obtained ultimately.

((("YAMADA TARO"@3 AND "SHIBUYA RESEARCH CENTER"@4) OR ("YAMADA TARO"@6 AND "SHIBUYA RESEARCH CENTER"@7))

AND ("STRUCTURED DOCUMENT"@1 OR "STRUCTURED DOCUMENT"@10))

The text index shown in FIG. 26 is referred to by use of the thus-obtained Boolean expression, so that document-ID "1" is obtained as a search result.

Search Request 7

In Search Request 7, the search conditions used in Search Request 6 are modified to include the sibling order relationship among document parts. That is, a document which is written by "Author" who is defined such that "Name" is ""YAMADA TARO"" and "Section" is ""SHIBUYA RESEARCH CENTER"" and in which "Title" includes ""STRUCTURED DOCUMENT"", "Name" precedes "Section," and "Author" precedes "Title" is searched.

1) The sibling order relationship among document parts is included in the search request, and then the processing in step S87 shown in FIG. 11 is performed. That is, since all the documents satisfy the condition of "Name" preceding "Section," the processing up to the processing in 4) above for Search Request 6 (the example shown in FIG. 30) is performed in the same manner.

Figure 33:
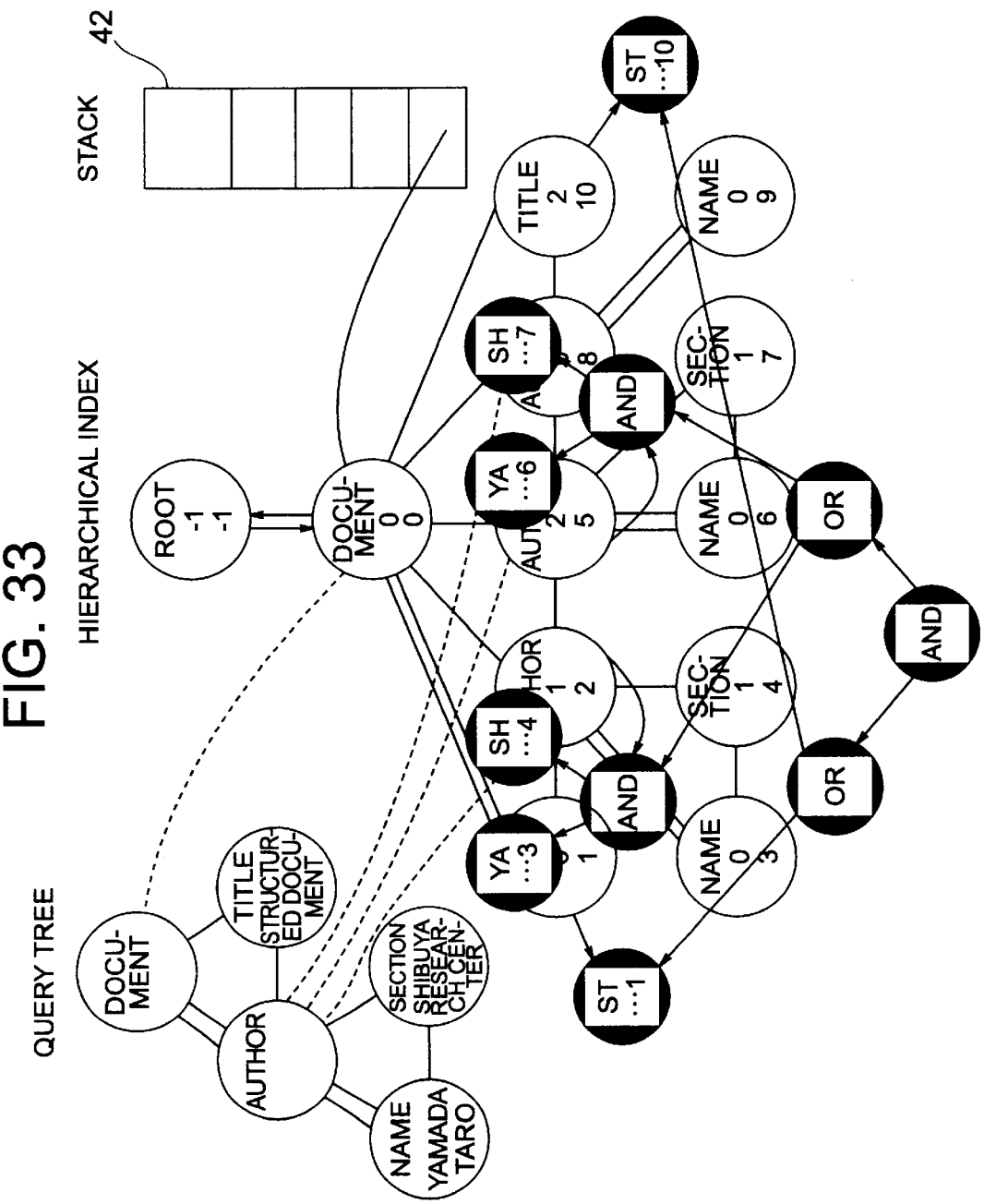
FIGS. 33 to 35 are diagrams showing an internal operation for converting Search Request 7 to a Boolean expression.

2) Subsequently, when the processing in steps S83 and S84 is performed for temporary nodes lower in level than the node of the hierarchical index corresponding to the "Document" node, the logic tree shown in FIG. 33 is assembled.

Figure 34:
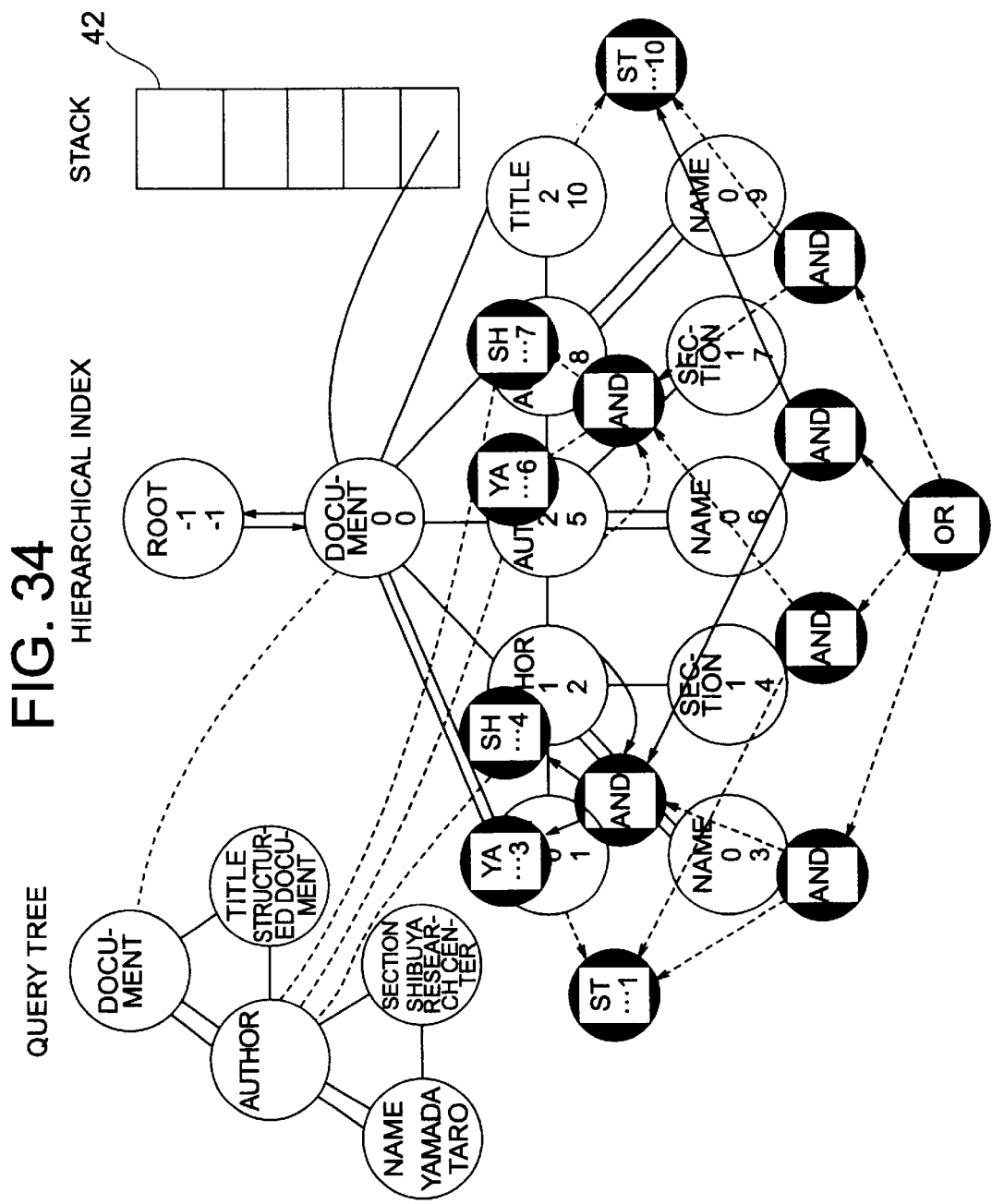

3) When the logic tree shown in FIG. 33 is converted to the disjunctive normal form, the state shown in FIG. 34 is obtained. Since AND nodes other than the second AND node as counted from the right fail to satisfy the order relationship, the AND nodes other than the second AND node are discarded.

Figure 35:
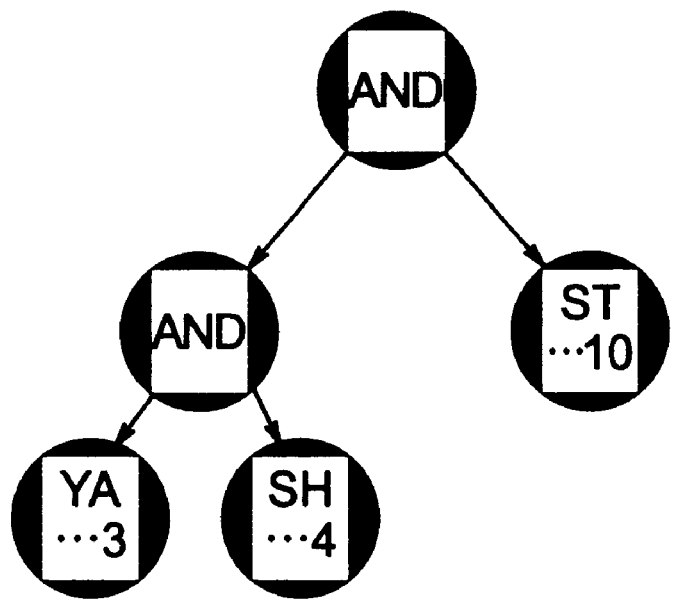

4) Ultimately, the logic tree shown in FIG. 35 is assembled, and the logic tree is converted to a character string by means of the processing in step S63 shown in FIG. 9, so that the following Boolean expression is obtained.

(("YAMADA TARO"@3 AND "SHIBUYA RESEARCH CENTER"@4) AND "STRUCTURED DOCUMENT"@10)

The text index shown in FIG. 26 is referred to by use of the thus-obtained Boolean expression, so that a message "no document found" is obtained as a search result.

As described above, in the present invention, there are provided a hierarchical index which expresses the structure of each structured document, and a text index which is used for searching a document-ID on the basis of a search key composed of a part-ID and a character string in text data; a user's query received in the form of a tree structure is converted to a Boolean expression; and the text index is referred to in order to obtain a document-ID corresponding to the query tree. Thus, it becomes possible to search structured documents, while maintaining the high speed of conventional full-text search engines.

Further, since the hierarchical index stores a sibling relationship between document parts, not only a parent-child relationship but also a sibling relationship can be specified in search conditions. This enables obtainment of search results of higher accuracy as compared with the case of a conventional system.

The many features and advantages of the invention are apparent from the detailed specification and, thus, the appended claims are intended to cover all such features and advantages of the invention which fall within the true spirit and scope of the invention. Further, since numerous modifications and changes will readily occur to those skilled in the art, it is not intended that the invention be limited to the exact construction and operation illustrated and described, and accordingly all suitable modifications and equivalents may be resorted to, so long as they fall within the scope of the invention.

What is claimed is:

1. A structured-document search apparatus for searching structures and text data of structured documents, the apparatus comprising:

first store means for storing a hierarchical index that represents a hierarchical relationship among document parts and is expressed in a tree structure in which each of a plurality of meta parts forms a single node, the document parts being elements of each of the structured documents, and the document parts that are common in structure among the structured documents being regarded as the meta parts;

second store means for storing a text index in which information representing a relationship between a set and a document-ID is registered, the set having a character string in text data and a part-ID identifying a meta part, and the document-ID being an ID of a document in which the character string and the meta part appear; and search means for searching a structure from the hierarchical index on the basis of a query tree that represents a query in the tree structure, and for searching a document corresponding to the query tree by referring to the text index on the basis of a search result on the structure, the query designating search conditions that express relationships among the document parts, including a sibling relationship in the tree structure, the search means comprising first refer means for referring to the hierarchical index and for converting the query tree to a Boolean expression in which a set having a character string and a part-ID is used as a single search key, and second refer means for referring to the text index and for obtaining a document-ID of a document corresponding to the query tree by use of the Boolean expression, hierarchical index creating means for judging, for corresponding document parts of respective structured documents to be subjected to search, whether the document parts are meta parts that satisfy conditions in which each of the nodes shares a common upper meta part and has a same element name and a same offset in a row of sibling parts in the document, the hierarchical index creating means setting, for the node information regarding the offset in the row of sibling parts in the document, a link extending from a child node to a parent node, and a link extending to another node having the same element name by assigning a part-ID to the document parts and registering as a node of the hierarchical index, when the document parts are meta parts.

2. A structured-document search apparatus according to claim 1, wherein, in the query, either a sibling relationship with order or a sibling relationship without order among the document parts is selectively designated, and wherein the search means performs matching between the query tree and the hierarchical index on the basis of a designated one of the sibling relationship with order and the sibling relationship without order.

3. A structured-document search apparatus according to claim 1, wherein the search means converts to a Boolean expression the search conditions that are expressed in the form of a query tree and that contain a sibling relationship among the document parts.

4. A structured-document search apparatus according to claim 1, wherein nodes of the same meta parts in the hierarchical index are generated with each of the nodes sharing a common upper meta part and having a same element name and a same offset in a row of sibling parts in the document, and wherein each node has information regarding an offset in a row of sibling parts in the document, a link extending from a child node to a parent node, and a link extending to another node having the same element name.

5. A structured-document search apparatus according to claim 1, wherein the search means inputs as a search request the query in which relationships among document parts, including a sibling relationship, are expressed in the tree structure and which designates the search conditions, and searches on the basis of the query tree that represents the query in the tree structure.

6. A structured-document search apparatus according to claim 1, further comprising:

text index creating means for creating a special key composed of a special character string and a part-ID, and for registering in the text index, for each document part, when a set composed of a character string in text data and a part-ID is created.

7. A structured-document search apparatus according to claim 1, further comprising:

text index creating means for creating pseudo text data, which are obtained through addition of special character strings at a start and an end position of the text data, and for creating a search key to be registered in the text index created from the pseudo text data, for each text data, when a set composed of a character string in text data and a part-ID is created.

8. A structured-document search apparatus according to claim 1, further comprising:

a structured-document storage data base storing the structured documents; and a document management engine receiving the query and search result from the search means, and extracting and returning a necessary portion of a searched document.

9. A structured-document search method for searching structures and text data of structured documents, the method comprising:

matching a structure of a query tree and a structure of a hierarchical index in which a hierarchical relationship among document parts of each of the structured documents to be searched is expressed in a tree structure in which a meta part is treated as a single node, and generating a search key with a character string and a part-ID identifying the meta part on the basis of a matched portion, the query tree representing a query in the tree structure, the query being expressed in the tree structure and designating relationships among the document parts, which are elements of the structured document, as a search condition;

on the basis of the search key, referring to a text index in which is registered information representing a relationship between sets having a part-ID of a meta part and a character string in text data of a structured document to be searched and a document-ID of a document in which the character string appears; and searching a document corresponding to the query tree, said searching comprising referring to the hierarchical index and converting the query tree to a Boolean expression in which a set having a character string and a part-ID is used as a single search key, and referring to the text index and obtaining a document-ID of a document corresponding to the query tree by use of the Boolean expression, hierarchical index creating for judging, for corresponding document parts of respective structured documents to be subjected to search, whether the document parts are meta parts that satisfy conditions in which each of the nodes shares a common upper meta part and has a same element name and a same offset in a row of sibling parts in the document, the hierarchical index creating for setting, for the node information regarding the offset in the row of sibling parts in the document, a link extending from a child node to a parent node, and a link extending to another node having the same element name by assigning a part-ID to the document parts and registering as a node of the hierarchical index, when the document parts are meta parts.

10. A structured-document search method according to claim 9, the method further comprising:

inputting as a search request the query that is expressed in the tree structure and in which a sibling relationship among the document parts, which are elements of the structured document, are designated as the search condition, and creating the query tree that represents the query in the tree structure.

11. A computer-readable storage controlling a computer to search structures and text data of structured documents, and comprising a process of:

matching a structure of a query tree and a structure of a hierarchical index in which a hierarchical relationship among document parts of each of the structured documents to be searched is expressed in a tree structure in which a meta part is treated as a single node, and generating a search key having a character string and a part-ID identifying the meta part on the basis of a matched portion, the query tree representing a query in the tree structure, the query being expressed in the tree structure and designating relationships among the document parts, which are elements of the structured documents, as a search condition;

referring, on the basis of the search key, to a text index in which is registered information representing a relationship between sets having a part-ID of a meta part and a character string in text data of a structured document to be searched and a document-ID of a document in which the character string appears; and searching a document corresponding to the query tree, said searching comprising referring to the hierarchical index and converting the query tree to a Boolean expression in which a set having a character string and a part-ID is used as a single search key, and referring to the text index and obtaining a document-ID of a document corresponding to the query tree by use of the Boolean expression, hierarchical index creating for judging, for corresponding document parts of respective structured documents to be subjected to search, whether the document parts are meta parts that satisfy conditions in which each of the nodes shares a common upper meta part and has a same element name and a same offset in a row of sibling parts in the document, the hierarchical index creating for setting, for the node information regarding the offset in the row of sibling parts in the document, a link extending from a child node to a parent node, and a link extending to another node having the same element name by assigning a part-ID to the document parts and registering as a node of the hierarchical index, when the document parts are meta parts.

12. A computer-readable storage according to claim 11, further comprising:

inputting as a search request the query which is expressed in the tree structure and in which a sibling relationship among document parts, which are elements of the structured documents, are designated as the search condition, and creating the query tree the represents the query in the tree structure.

13. A method for creating an index used in a structured-document search apparatus for searching structures and text data of structured documents, wherein the structured-document search apparatus receives as a search request a query in which document parts, which are elements of the structured documents, are expressed in a tree structure with a query tree representing a query in the tree structure, refers to a hierarchical index in which a hierarchical relationship among document parts of each of the structured documents to be searched is expressed in the tree structure in which a meta part is treated as a single node, and refers to a text index that stores a search key having a character string in text data and a part-ID identifying a meta part and stores a document-ID of a document in which the search key appears, to search structures and text data of structured documents, wherein, when the hierarchical index is created,
 judgment is made for corresponding document parts of respective structured documents to be subjected to searching whether the document parts are meta parts that satisfy conditions in which each of one or more nodes shares a common upper meta part and has a same element name and a same offset in a row of sibling parts in the structured document, and
 when the document parts are meta parts, a part-ID is assigned to the document parts, which are registered as a node of the hierarchical index, and set for the node information regarding the offset in a row of sibling parts in the document, a link extending from a child node to a parent node, and a link extending to another node having the same element name and wherein searching a document comprises
 referring to the hierarchical index and converting the query tree to a Boolean expression in which a set having a character string and a part-ID is used as a single search key, and
 referring to the text index and obtaining a document-ID of a document corresponding to the query tree by use of the Boolean expression, hierarchical index creating for judging, for corresponding document parts of respective structured documents to be subjected to search, whether the document parts are meta parts that satisfy conditions in which each of the nodes shares a common upper meta part and has a same element name and a same offset in a row of sibling parts in the document, the hierarchical index creating for setting, for the node information regarding the offset in the row of sibling parts in the document, a link extending from a child node to a parent node, and a link extending to another node having the same element name by assigning a part-ID to the document parts and registering as a node of the hierarchical index, when the document parts are meta parts.

14. A method for creating an index used in a structured-document search apparatus for searching structures and text data of structured documents, wherein the apparatus inputs as a search request a query in which document parts, which are elements of the structured documents, are expressed in a tree structure with a query tree representing a query in the tree structure, the apparatus referring to a hierarchical index in which a hierarchical relationship among the document parts of each of the structured documents to be searched is expressed in the tree structure in which a meta part is treated as a single node and referring to a text index that stores a search key composed of a character string in text data and a part-ID identifying a meta part and stores a document-ID of a document in which the search key appears, to search structures and text data of the structured documents, wherein, when a set comprising a character string in text data and a part-ID is created during creation of the text index, for each document part, a special key comprising a special character string and a part-ID is created and registered in the text index, and wherein searching a document comprises
 referring to the hierarchical index and converting the query tree to a Boolean expression in which a set having a character string and a part-ID is used as a single search key, and
 referring to the text index and obtaining a document-ID of a document corresponding to the query tree by use of the Boolean expression, hierarchical index creating for judging, for corresponding document parts of respective structured documents to be subjected to search, whether the document parts are meta parts that satisfy conditions in which each of the nodes shares a common upper meta part and has a same element name and a same offset in a row of sibling parts in the document, the hierarchical index creating for setting, for the node information regarding the offset in the row of sibling parts in the document, a link extending from a child node to a parent node, and a link extending to another node having the same element name by assigning a part-ID to the document parts and registering as a node of the hierarchical index, when the document parts are meta parts.

15. A method for creating an index used in a structured-document search apparatus for searching structures and text data of structured documents, wherein the apparatus inputs as a search request a query in which document parts, which are elements of the structured documents, are expressed in a tree structure with a query tree representing a query in the tree structure, the apparatus referring to a hierarchical index in which a hierarchical relationship among the document parts of each of the structured documents to be searched is expressed in a tree structure in which a meta part is treated as a single node and referring to a text index that stores a search key comprising a character string in text data and a part-ID identifying a meta part and stores a document-ID of a document in which the search key appears, to search structures and text data of the structured documents, wherein, when a set comprising a character string in text data and a part-ID is created during creation of the text index, for each text data, pseudo text data that are obtained through addition of special character strings at a start and an end position of the text data are created and the search key to be registered in the text index is created from the pseudo text data, and wherein searching a document comprises
 referring to the hierarchical index and converting the query tree to a Boolean expression in which a set having a character string and a part-ID is used as a single search key, and
 referring to the text index and obtaining a document-ID of a document corresponding to the query tree by use of the Boolean expression, hierarchical index creating for judging, for corresponding document parts of respective structured documents to be subjected to search, whether the document parts are meta parts that satisfy conditions in which each of the nodes shares a common upper meta part and has a same element name and a same offset in a row of sibling parts in the document, the hierarchical index creating for setting, for the node information regarding the offset in the row of sibling parts in the document, a link extending from a child node to a parent node, and a link extending to another node having the same element name by assigning a part-ID to the document parts and registering as a node of the hierarchical index, when the document parts are meta parts.

16. A structured-document search apparatus for searching structures and text data of structured documents, the apparatus comprising:

a first store unit storing a hierarchical index that represents a hierarchical relationship among document parts and is expressed in a tree structure in which each of a plurality of meta parts forms a single node, the document parts being elements of each of the structured documents, and the document parts that are common in structure among the structured documents being regarded as the meta parts;

a second store unit storing a text index in which information representing a relationship between a set and a document-ID is registered, the set having a character string in text data and a part-ID identifying a meta part, and the document-ID being an ID of a document in which the character string and the meta part appear; and a search unit searching a structure from the hierarchical index on the basis of a query tree that represents a query in the tree structure, and for searching a document corresponding to the query tree by referring to the text index on the basis of a search result on the structure, the query designating search conditions that express relationships among the document parts, including a sibling relationship in the tree structure, the search unit comprising a first refer unit referring to the hierarchical index and converting the query tree to a Boolean expression in which a set having a character string and a part-ID is used as a single search key, and a second refer unit referring to the text index and obtaining a document-ID of a document corresponding to the query tree by use of the Boolean expression, hierarchical index creating for judging, for corresponding document parts of respective structured documents to be subjected to search, whether the document parts are meta parts that satisfy conditions in which each of the nodes shares a common upper meta part and has a same element name and a same offset in a row of sibling parts in the document, the hierarchical index creating for setting, for the node information regarding the offset in the row of sibling parts in the document, a link extending from a child node to a parent node, and a link extending to another node having the same element name by assigning a part-ID to the document parts and registering as a node of the hierarchical index, when the document parts are meta parts.

17. A method for creating an index used in a structured-document search apparatus for searching structures and text data of structured documents, comprising:

receiving as a search request, by the structured-document search apparatus, a query in which document parts, which are elements of the structured documents, are expressed in a tree structure with a query tree representing a query in the tree structure, referring to a hierarchical index in which a hierarchical relationship among document parts of each the structured documents to be searched is expressed in the tree structure in which a meta part is treated as a single node, and referring to a text index that stores a search key having a character string in text data and a part-ID identifying a meta part and stores a document-ID of a document in which the search key appears;

determining, when the hierarchical index is created, for corresponding document parts of respective structured documents to be subjected to searching, whether the document parts are meta parts that satisfy conditions in which each of one or more nodes shares a common upper meta part and has a same element name and a same offset in a row of sibling parts in the structured document; and assigning, when the document parts are meta parts, a part-ID to the document parts, which are registered as a node of the hierarchical index, and setting a link extending from a child node to a parent node and a link extending to another node having the same element name as node information regarding the offset in a row of sibling parts in the document, wherein searching a document comprises referring to the hierarchical index and converting the query tree to a Boolean expression in which a set having a character string and a part-ID is used as a single search key, and referring to the text index and obtaining a document-ID of a document corresponding to the query tree by use of the Boolean expression, hierarchical index creating for judging, for corresponding document parts of respective structured documents to be subjected to search, whether the document parts are meta parts that satisfy conditions in which each of the nodes shares a common upper meta part and has a same element name and a same offset in a row of sibling parts in the document, the hierarchical index creating for setting, for the node information regarding the offset in the row of sibling parts in the document, a link extending from a child node to a parent node, and a link extending to another node having the same element name by assigning a part-ID to the document parts and registering as a node of the hierarchical index, when the document parts are meta parts.

18. A method for creating an index used in a structured-document search apparatus for searching structures and text data of structured documents, comprising:

inputting as a search request, by the apparatus, a query in which document parts, which are elements of the structured documents, are expressed in a tree structure with a query tree representing a query in the tree structure, referring to a hierarchical index in which a hierarchical relationship among the document parts of each of the structured documents to be searched is expressed in the tree structure in which a meta part is treated as a single node, and referring to a text index that stores a search key composed of a character string in text data and a part-ID identifying a meta part and stores a document-ID of a document in which the search key appears; and creating, when a set comprising a character string in text data and a part-ID is created during creation of the text index, for each document part, a special key comprising a special character string and a part-ID and registering the special key in the text index, wherein searching a document comprises
referring to the hierarchical index and converting the query tree to a Boolean expression in which a set having a character string and a part-ID is used as a single search key, and
referring to the text index and obtaining a document-ID of a document corresponding to the query tree by use of the Boolean expression, hierarchical index creating for judging, for corresponding document parts of respective structured documents to be subjected to search, whether the document parts are meta parts that satisfy conditions in which each of the nodes shares a common upper meta part and has a same element name and a same offset in a row of sibling parts in the document, the hierarchical index creating for setting, for the node information regarding the offset in the row of sibling parts in the document, a link extending from a child node to a parent node, and a link extending to another node having the same element name by assigning a part-ID to the document parts and registering as a node of the hierarchical index, when the document parts are meta parts.

19. A method for creating an index used in a structured-document search apparatus for searching structures and text data of structured documents, inputting as a search request, by the apparatus, a query in which document parts, which are elements of the structured documents, are expressed in a tree structure with a query tree representing a query in the tree structure, the apparatus referring to a hierarchical index in which a hierarchical relationship among the document parts of each of the structured documents to be searched is expressed in a tree structure in which a meta part is treated as a single node and referring to a text index that stores a search key comprising a character string in text data and a part-ID identifying a meta part and stores a document-ID of a document in which the search key appears; and creating, when a set comprising a character string in text data and a part-ID is created during creation of the text index, for each text data, pseudo text data that are obtained through addition of special character strings at a start and an end position of the text data, the search key to be registered in the text index being created from the pseudo text data, wherein searching a document comprises
referring to the hierarchical index and converting the query tree to a Boolean expression in which a set having a character string and a part-ID is used as a single search key, and
referring to the text index and obtaining a document-ID of a document corresponding to the query tree by use of the Boolean expression, hierarchical index creating for judging, for corresponding document parts of respective structured documents to be subjected to search, whether the document parts are meta parts that satisfy conditions in which each of the nodes shares a common upper meta part and has a same element name and a same offset in a row of sibling parts in the document, the hierarchical index creating for setting, for the node information regarding the offset in the row of sibling parts in the document, a link extending from a child node to a parent node, and a link extending to another node having the same element name by assigning a part-ID to the document parts and registering as a node of the hierarchical index, when the document parts are meta parts.

* * * * *

UNITED STATES PATENT AND TRADEMARK OFFICE
CERTIFICATE OF CORRECTION

PATENT NO. : 6,853,992 B2  Page 1 of 1
DATED : February 8, 2005
INVENTOR(S) : Nobuyuki Igata It is certified that error appears in the above-identified patent and that said Letters Patent is hereby corrected as shown below:

Column 24,
Line 60, change "the" second occurrence to -- that --.

Column 25,
Line 27, insert -- , -- after "name".

Column 28,
Line 1, insert -- of -- after "each".

Signed and Sealed this

Twentieth Day of September, 2005

JON W. DUDAS
*Director of the United States Patent and Trademark Office*